United States Patent
Ulrey et al.

(10) Patent No.: US 9,651,003 B2
(45) Date of Patent: May 16, 2017

(54) SYSTEM AND METHOD FOR IMPROVING CANISTER PURGING

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 315 days.

(21) Appl. No.: 14/593,945

(22) Filed: Jan. 9, 2015

(65) Prior Publication Data

US 2016/0201613 A1 Jul. 14, 2016

(51) Int. Cl.
| | | |
|---|---|---|
| F02M 25/08 | (2006.01) | |
| F02D 41/00 | (2006.01) | |
| F02B 37/16 | (2006.01) | |
| F02B 37/00 | (2006.01) | |

(52) U.S. Cl.
CPC ......... *F02M 25/089* (2013.01); *F02B 37/164* (2013.01); *F02D 41/004* (2013.01); *F02D 41/0007* (2013.01); *F02D 41/0032* (2013.01); *F02M 25/0836* (2013.01); *F02B 37/00* (2013.01); *F02D 2250/41* (2013.01); *Y02T 10/144* (2013.01)

(58) Field of Classification Search
CPC .............. F02M 25/089; F02M 25/0836; F02D 41/0007; F02D 41/004; F02D 41/0032; F02D 2250/41; F02B 37/16; F02B 2037/162; F02B 37/164
See application file for complete search history.

(56) References Cited

U.S. PATENT DOCUMENTS

| | | |
|---|---|---|
| 5,005,550 A | 4/1991 | Bugin, Jr. et al. |
| 6,880,534 B2 | 4/2005 | Yoshiki et al. |
| 6,951,199 B2 | 10/2005 | Suzuki |
| 7,966,996 B1 | 6/2011 | Pursifull |
| 8,483,934 B2 | 7/2013 | Cunningham et al. |
| 8,683,800 B2* | 4/2014 | Cunningham ............ F04F 5/20 123/559.1 |
| 8,925,520 B2* | 1/2015 | Pursifull .......... F02M 35/10229 123/339.23 |

(Continued)

FOREIGN PATENT DOCUMENTS

DE 102011084539 B3 12/2012

OTHER PUBLICATIONS

Pursifull, R. et al., "System and Method for Improving Canister Purging," U.S. Appl. No. 14/740,619, filed Jun. 16, 2015, 68 pages.

(Continued)

*Primary Examiner* — Thomas Moulis
(74) *Attorney, Agent, or Firm* — Julia Voutyras; McCoy Russell LLP

(57) ABSTRACT

Systems and methods are provided for improving a purge flow from a canister via a canister purge valve in a boosted engine. One method comprises adjusting an opening of a shut-off valve to regulate compressor bypass flow through an aspirator, during boosted conditions, to generate vacuum at the aspirator. The vacuum is applied downstream of a solenoid valve and upstream of a sonic choke within a canister purge valve.

20 Claims, 11 Drawing Sheets

(56) References Cited

U.S. PATENT DOCUMENTS

| | | | |
|---|---|---|---|
| 9,010,115 B2* | 4/2015 | Pursifull | F02D 41/0007 |
| | | | 123/559.1 |
| 9,109,550 B2* | 8/2015 | Kempf | F02M 25/0836 |
| 9,133,796 B2* | 9/2015 | Plymale | F02M 25/089 |
| 9,133,852 B2* | 9/2015 | Fletcher | F04D 27/003 |
| 9,145,824 B2* | 9/2015 | Fletcher | F02B 37/164 |
| 9,188,087 B2* | 11/2015 | Surnilla | F02M 25/089 |
| 9,359,923 B2* | 6/2016 | Pursifull | F02B 37/127 |
| 2007/0295303 A1 | 12/2007 | Hirooka | |
| 2008/0000456 A1 | 1/2008 | Modien | |
| 2011/0146631 A1 | 6/2011 | Konohara et al. | |
| 2012/0016566 A1 | 1/2012 | Cunningham et al. | |
| 2012/0318244 A1 | 12/2012 | Williams | |
| 2013/0255646 A1 | 10/2013 | Ulrey et al. | |
| 2013/0263590 A1 | 10/2013 | Kempf et al. | |
| 2014/0138562 A1 | 5/2014 | Rollinger et al. | |
| 2014/0318514 A1 | 10/2014 | Pursifull | |

OTHER PUBLICATIONS

Pursifull, R. et al. "System and Method for Canister Purging," U.S. Appl. No. 14/742,535, filed Jun. 17, 2015, 56 pages.

Pursifull, Ross Dykstra et al., "System and Method for Improving Canister Purging," U.S. Appl. No. 14/593,985, filed Jan. 9, 2015, 83 pages.

Pursifull, Ross Dykstra et al., "Common Shut-Off Valve for Actuator Vacuum at Low Engine Power and Fuel Vapor Purge Vacuum at Boost," U.S. Appl. No. 14/593,915, filed Jan. 9, 2015, 50 pages.

Pursifull, R. et al., "System and Method for Controlling Canister Purging," U.S. Appl. No. 14/691,375, filed Apr. 20, 2015, 73 pages.

* cited by examiner

SYSTEM AND METHOD FOR IMPROVING CANISTER PURGING

FIELD

The present disclosure relates to systems and methods for improving purging of fuel vapors from a fuel vapor canister.

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system may allow the vapors to be purged into an engine intake manifold for use as fuel.

The purging of fuel vapors from the fuel vapor canister may involve opening a canister purge valve coupled to a conduit between the fuel vapor canister and the intake manifold. During a purge operation, vacuum or negative pressure in the intake manifold may draw air through the fuel vapor canister enabling desorption of fuel vapors from the canister. These desorbed fuel vapors may flow through the canister purge valve into the intake manifold. As such, the canister purge valve may regulate the flow of fuel vapors into the intake manifold via a sonic choke positioned between a valve in the canister purge valve and the intake manifold. Accordingly, the sonic choke may function as a flow restrictor in the purge path between the valve and the intake manifold.

In boosted engines, during boost conditions when the compressor is operational, the intake manifold may have a positive pressure. Herein, an aspirator coupled in a compressor bypass passage may generate vacuum that can be used to draw stored fuel vapors from the fuel vapor canister via the canister purge valve. However, purge flow through the aspirator may be lower because the sonic choke in the canister purge valve may excessively restrict purge flow to a suction port of the aspirator. Accordingly, a performance of the aspirator in terms of purging the fuel vapor canister may be severely diminished by the presence of the sonic choke in the flow path.

The inventors herein have recognized the above issue and identified approaches to at least partly address the issue. In one example, a method for a boosted engine comprises during boosted conditions, adjusting an opening of a shut-off valve to regulate compressor bypass flow through an aspirator, drawing vacuum at the aspirator, and applying the vacuum downstream of a valve and upstream of a sonic choke, the valve and the sonic choke positioned within a common housing in a canister purge valve. In this manner, the sonic choke may not restrict purge flow to the aspirator.

For example, a canister purge valve comprising a valve and a sonic choke may be included in a boosted engine. The valve may be a solenoid valve. Further, the sonic choke may be positioned downstream of, and proximate to, the valve in the canister purge valve within a single, common housing. The canister purge valve may comprise three ports: an inlet port fluidically coupled to a fuel vapor canister, a first outlet port fluidically coupled from downstream of the sonic choke to an intake manifold, and a second outlet port fluidically coupled from downstream of the solenoid valve and upstream of the sonic choke to a suction port of an ejector. The ejector may be coupled in a compressor bypass passage such that a motive inlet of the ejector is fluidically connected to an intake passage downstream of a compressor, and a motive outlet of the ejector is fluidically coupled to the intake passage upstream of the compressor. Motive flow through the ejector may be controlled by a shut-off valve coupled to the compressor bypass passage upstream of the motive inlet of the ejector. During boosted conditions, the shut-off valve may be adjusted to a mostly open (or fully open) position and the ejector may generate vacuum due to the flow of compressed air in the compressor bypass passage. This ejector vacuum may be applied to the canister purge valve via the second outlet port to draw stored vapors from a fuel vapor canister. Since the ejector vacuum is applied upstream of the sonic choke in the canister purge valve, vapors flowing through the valve in the canister purge valve may bypass the sonic choke as they flow towards the suction port of the ejector. Accordingly, purge flow of fuel vapors from the second outlet port of the canister purge valve into the suction port of the ejector may not be controlled by the sonic choke restriction.

In this way, fuel vapors stored in a fuel vapor canister may be purged in an unrestricted manner by using ejector vacuum during boosted conditions in a turbocharged engine. By circumventing the sonic choke in the purge path via the ejector, a purge flow rate to the compressor inlet may be enhanced. As such, the performance of the ejector in drawing stored fuel vapors from the fuel vapor canister may be improved. Overall, vehicle fuel economy and emissions compliance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
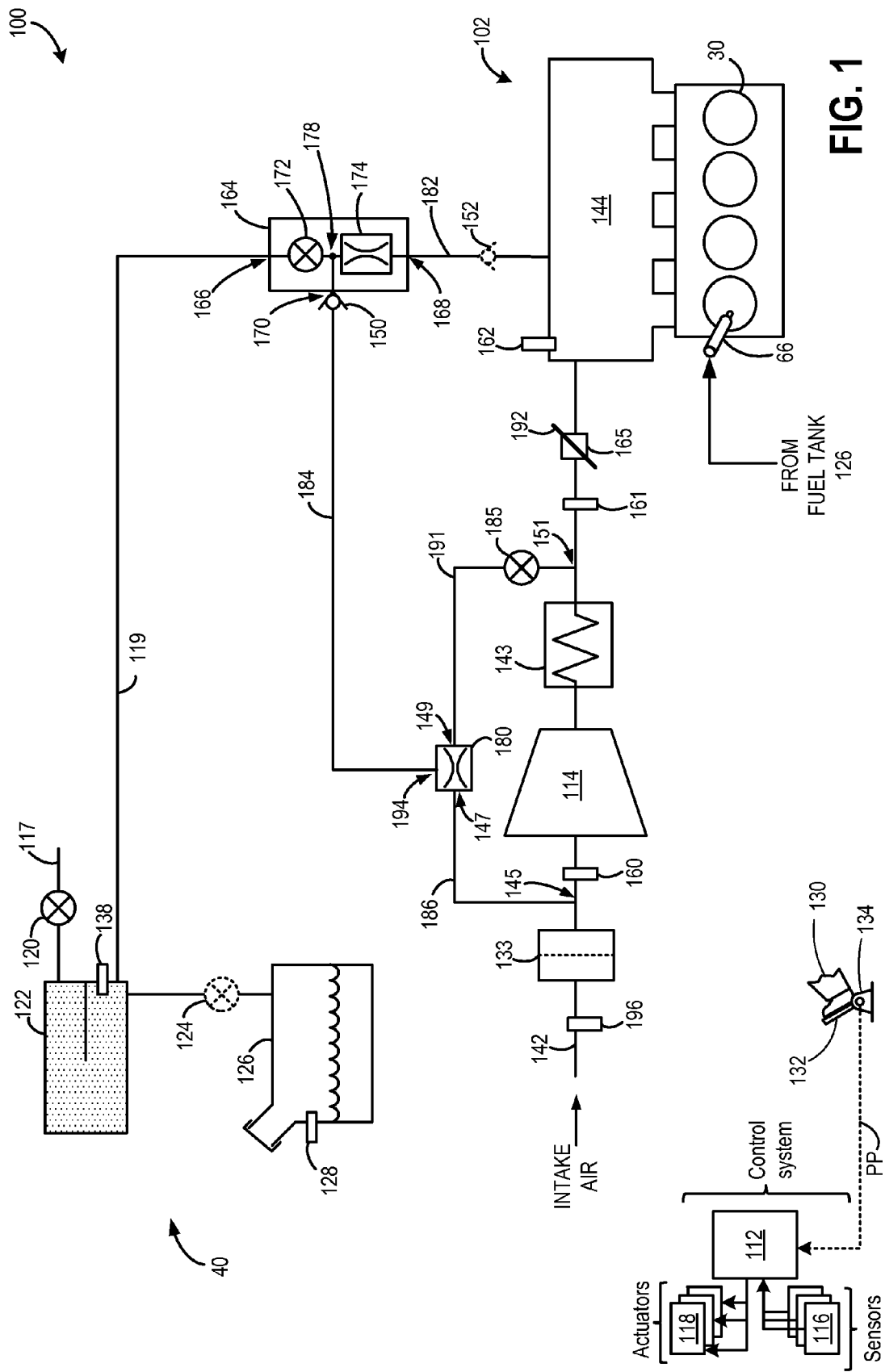
FIG. 1 is a schematic depiction of an example engine system including an example three-port canister purge valve, according to the present disclosure.
Figure 2:
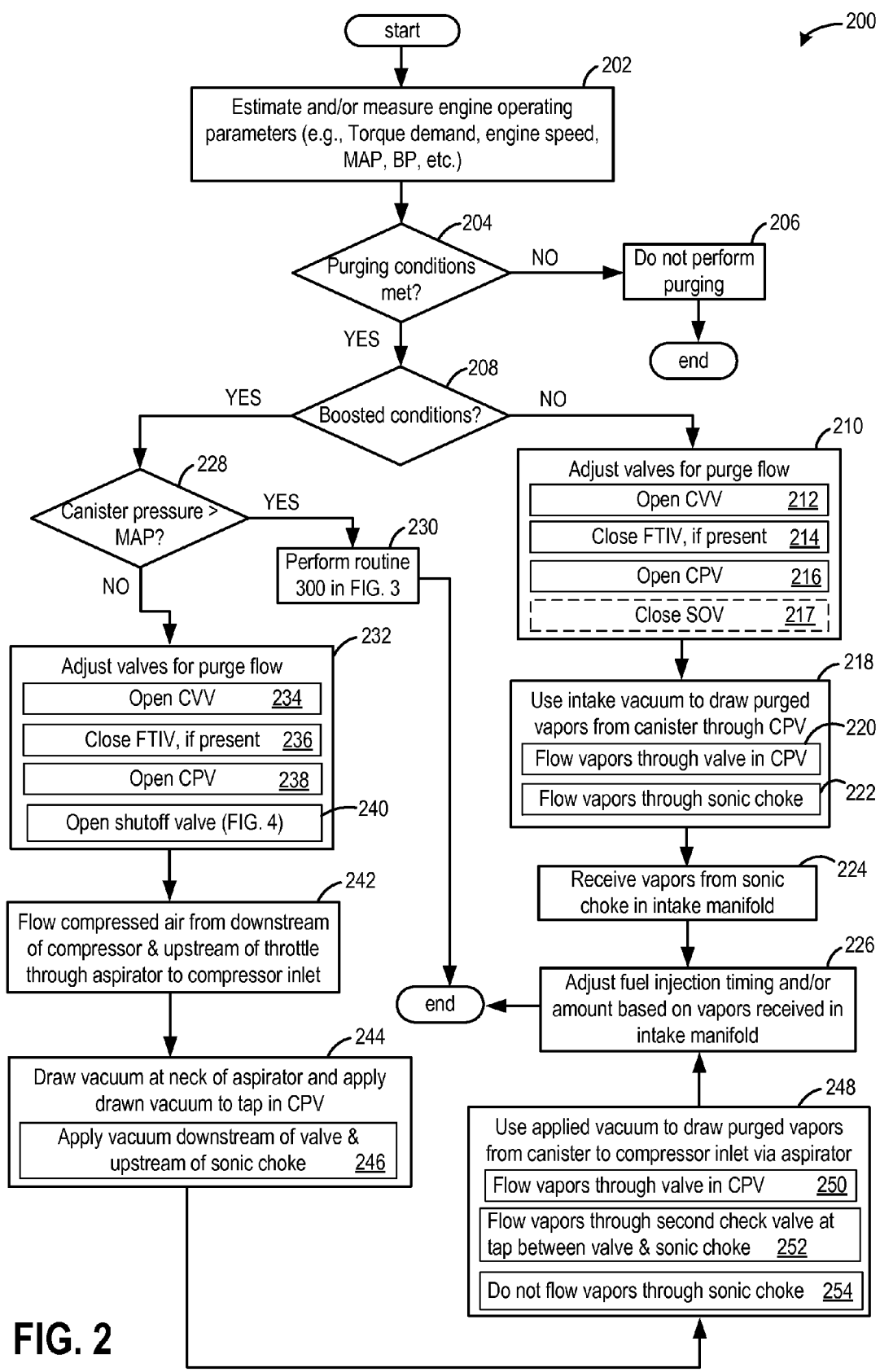
FIG. 2 presents a high level flowchart illustrating purge flow during boosted and non-boosted conditions in the example engine system of FIG. 1.
Figure 3:
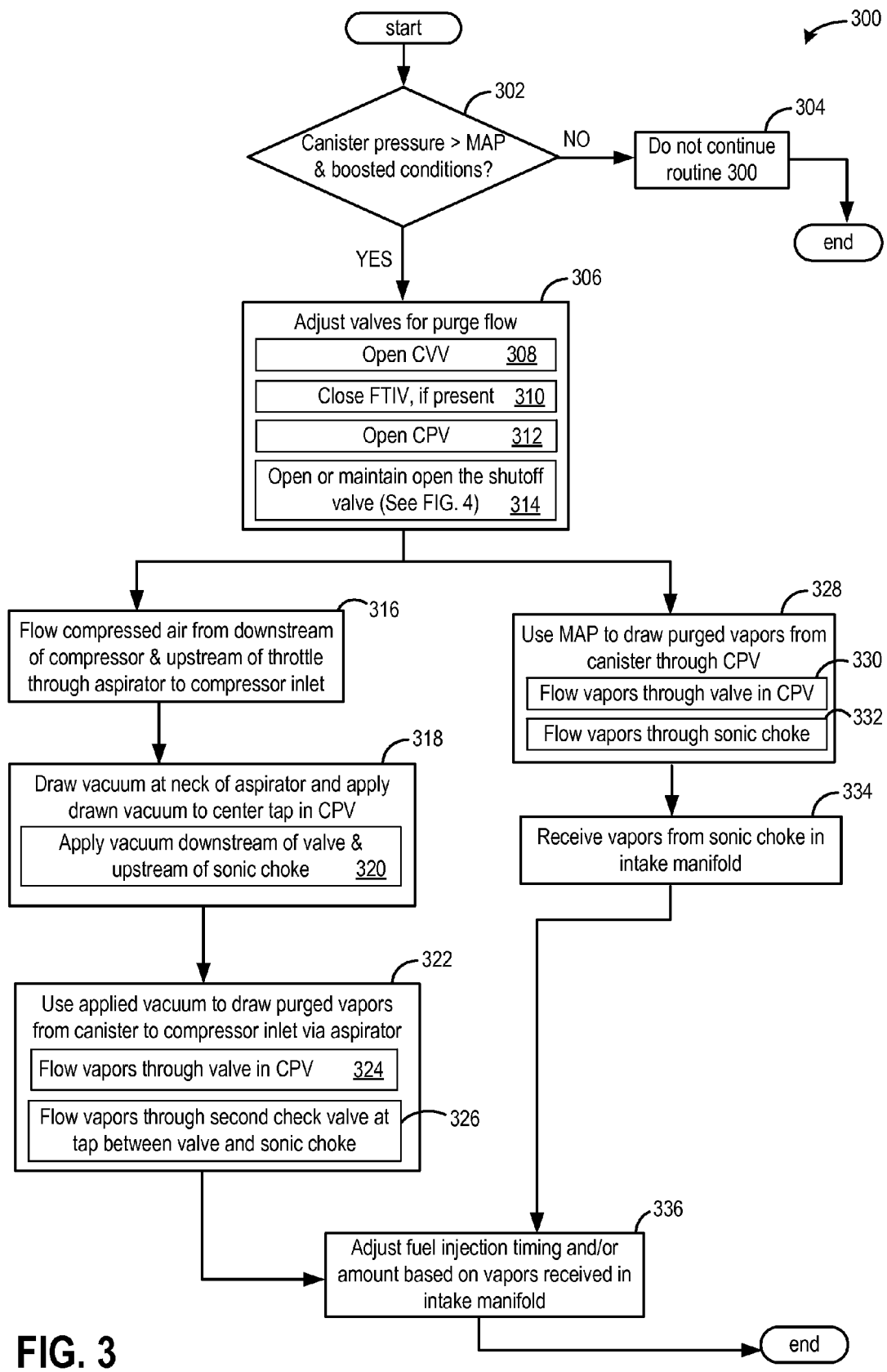
FIG. 3 depicts a high level flowchart for purge flow during boosted conditions when a canister pressure is higher than a pressure in an intake manifold in the example engine system of FIG. 1.
Figure 4:
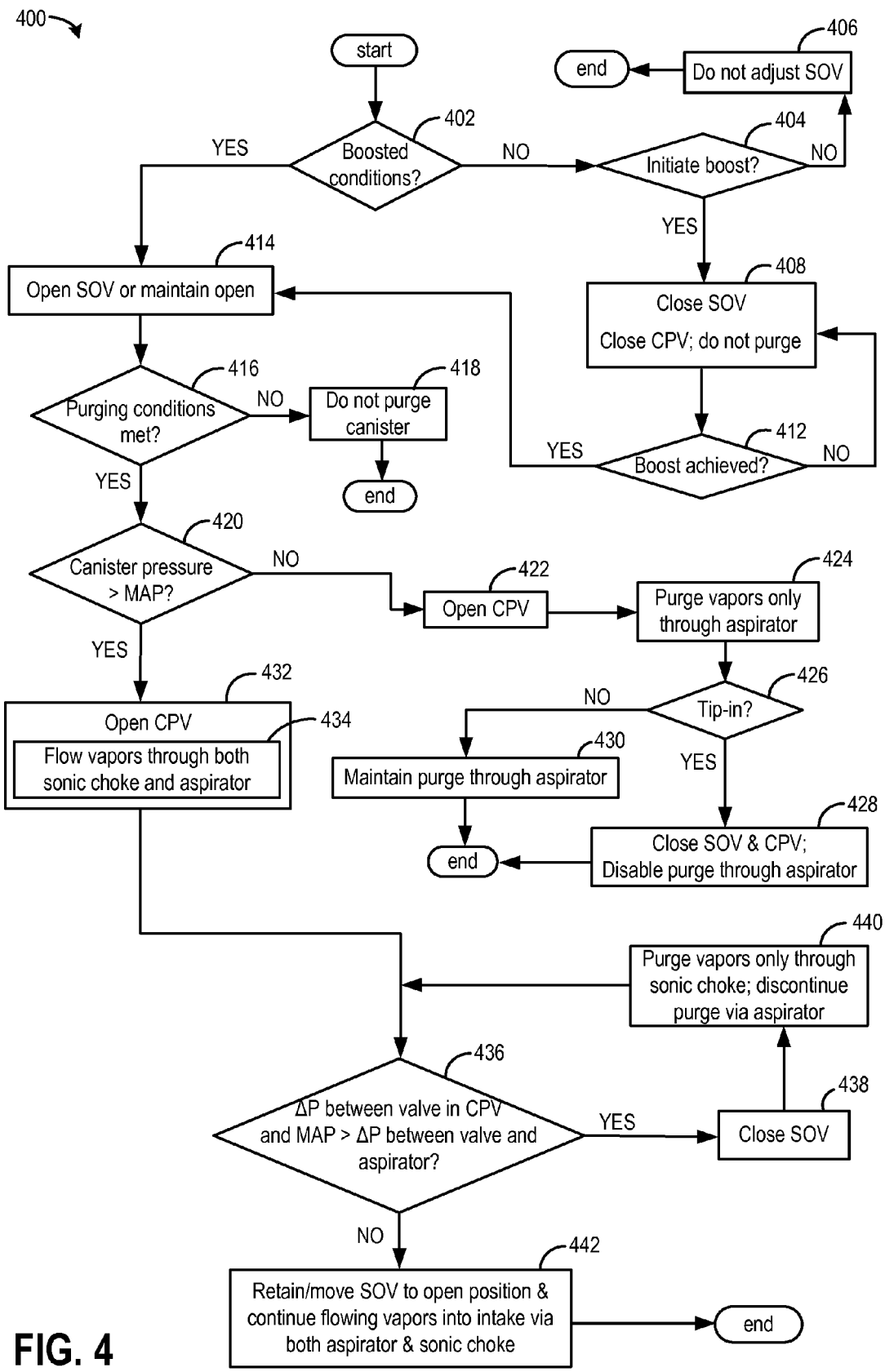
FIG. 4 is a high level flowchart for operating a shut-off valve coupled to an aspirator in the example engine system of FIG. 1.
Figure 5:
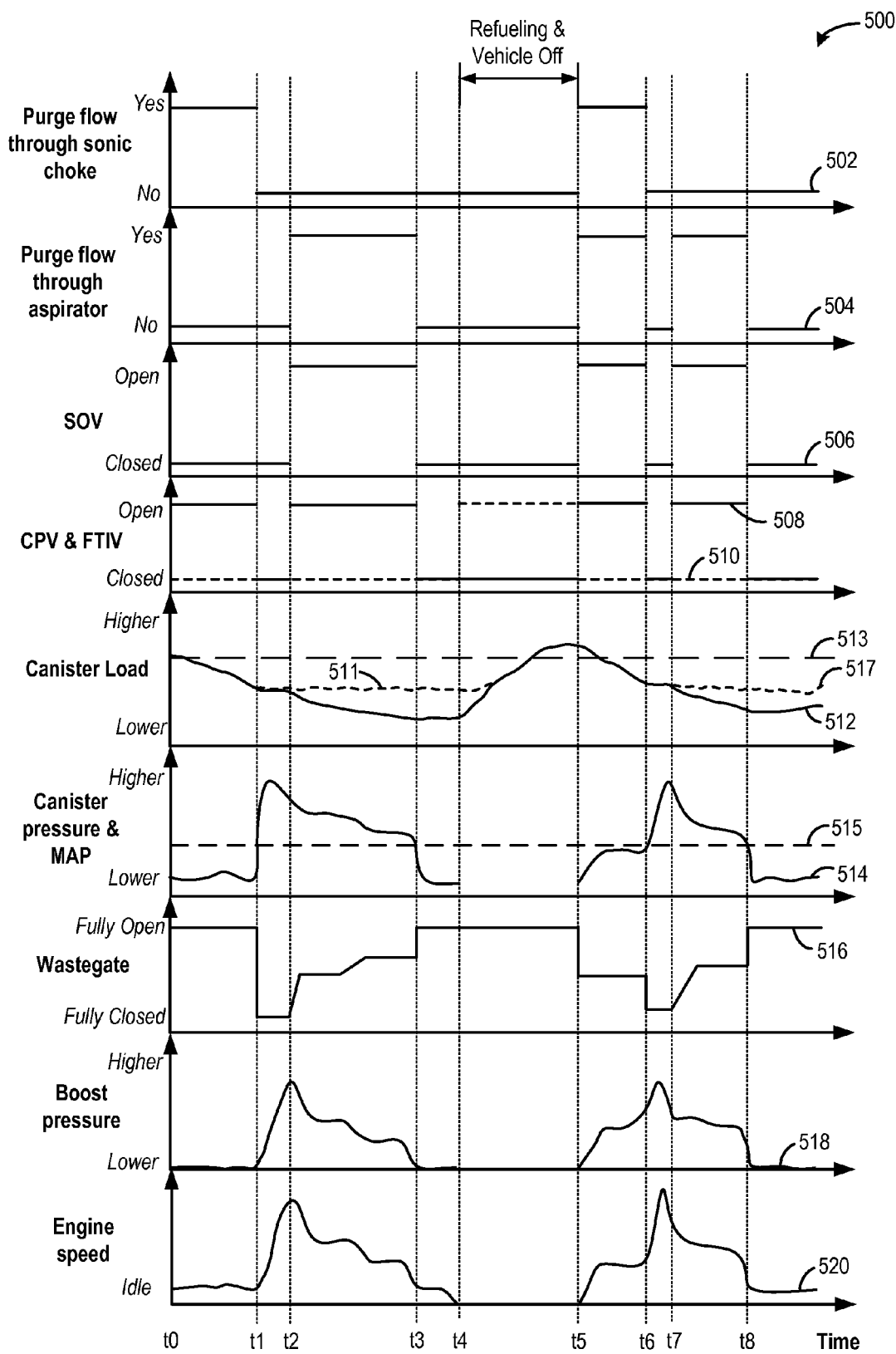
FIG. 5 depicts an example operation for purging a fuel vapor canister in the example engine system of FIG. 1.
Figure 6:
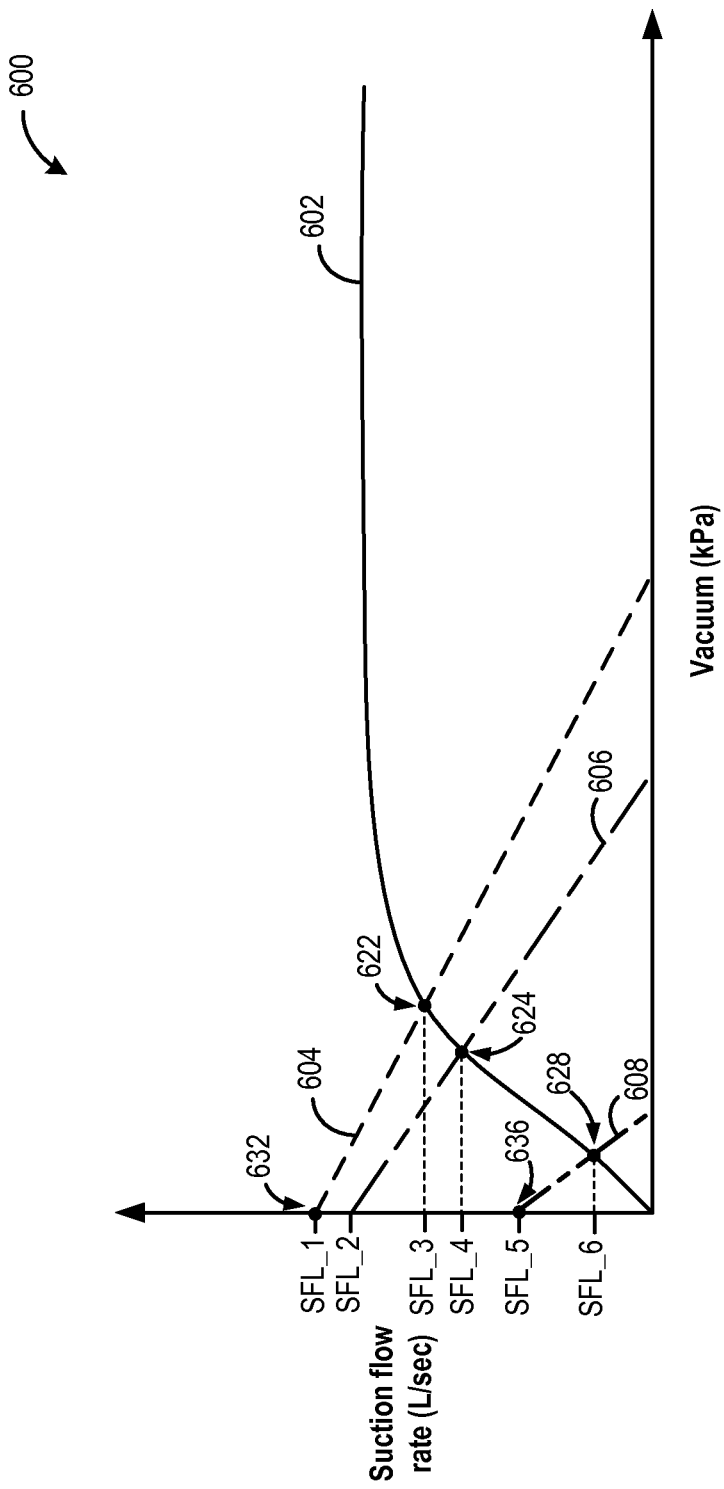
FIG. 6 presents a comparison between flow rates through an ejector when the ejector is coupled to a sonic choke and when the ejector bypasses the sonic choke.
Figure 7:
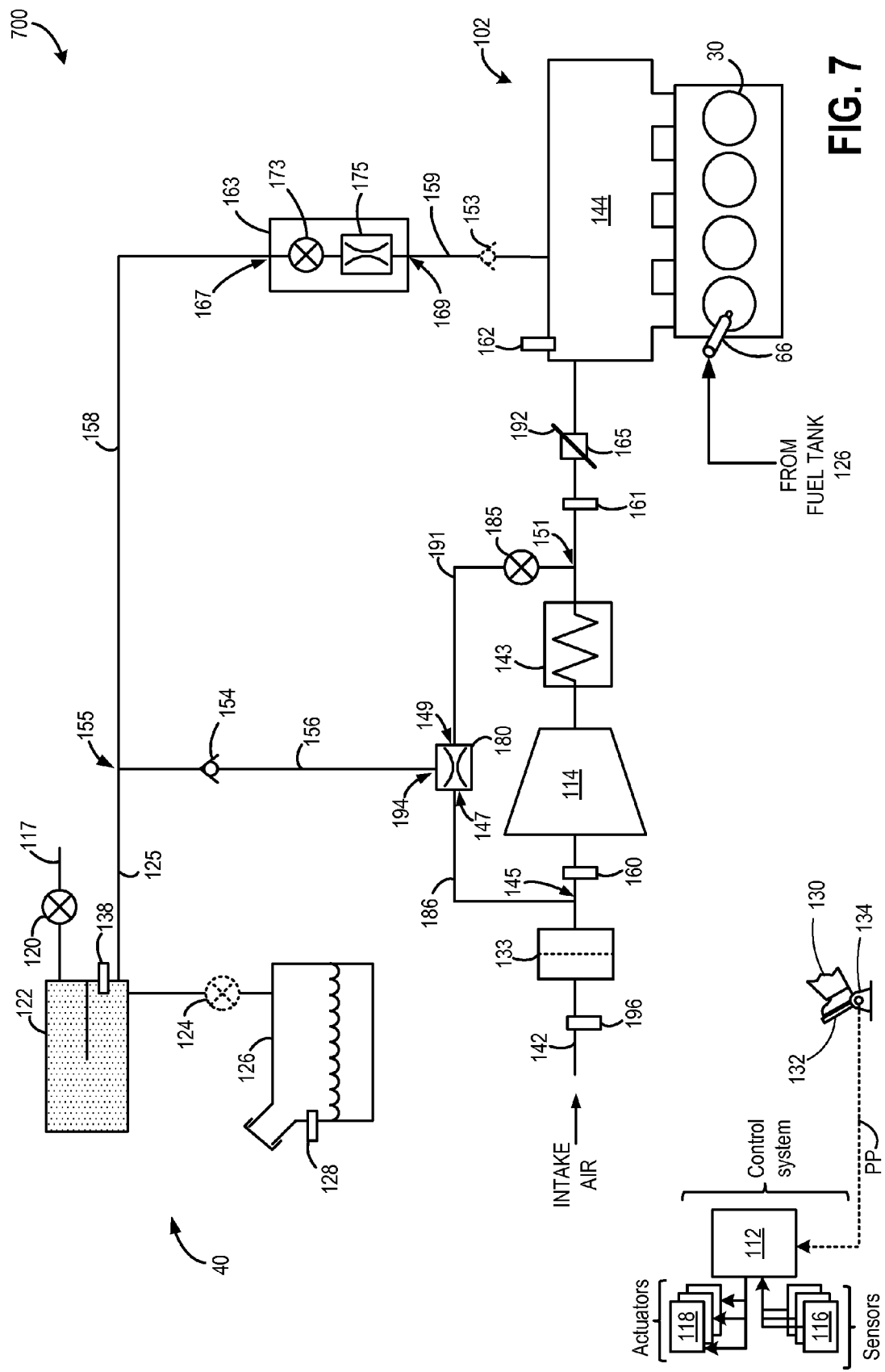
FIG. 7 is a schematic depiction of an example engine system with an alternative layout for evaporative emissions, according to the present disclosure.
Figure 8:
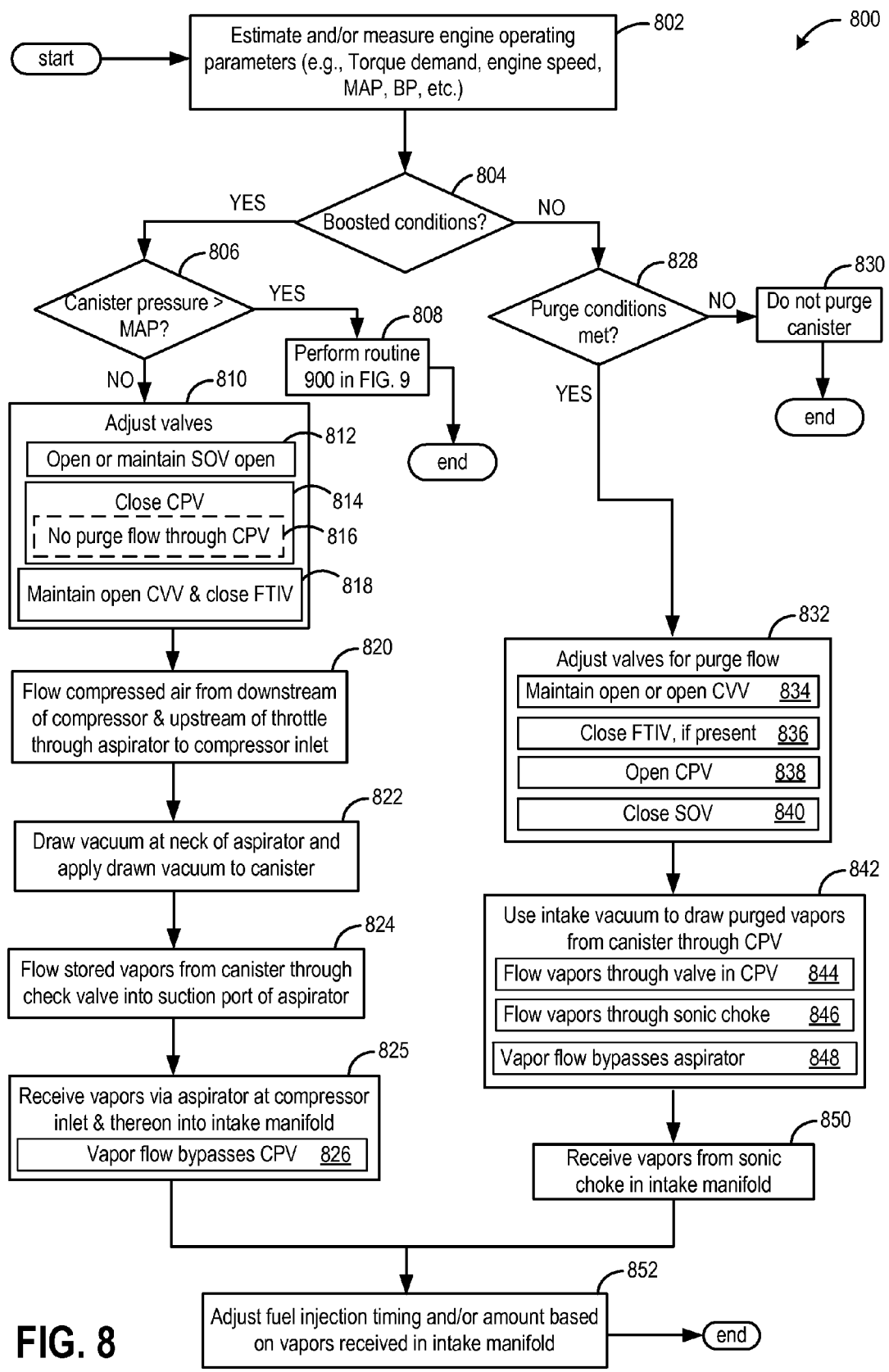
FIG. 8 demonstrates a high level flowchart illustrating purge flow during boosted and non-boosted conditions in the engine system of FIG. 7.
Figure 9:
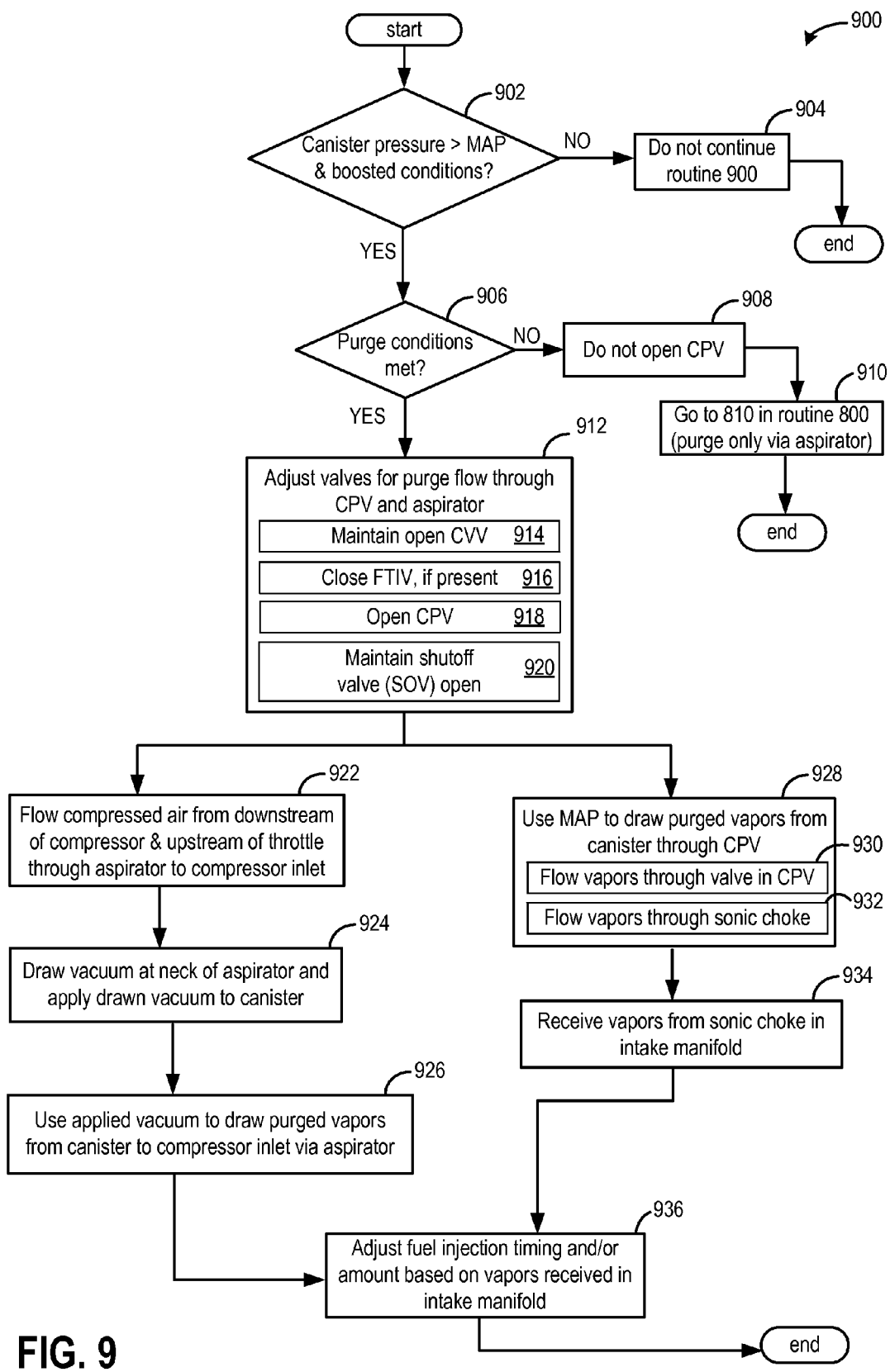
FIG. 9 depicts a high level flowchart for purge flow during boosted conditions when a canister pressure is higher than a pressure in an intake manifold in the example engine system of FIG. 7.
Figure 10:
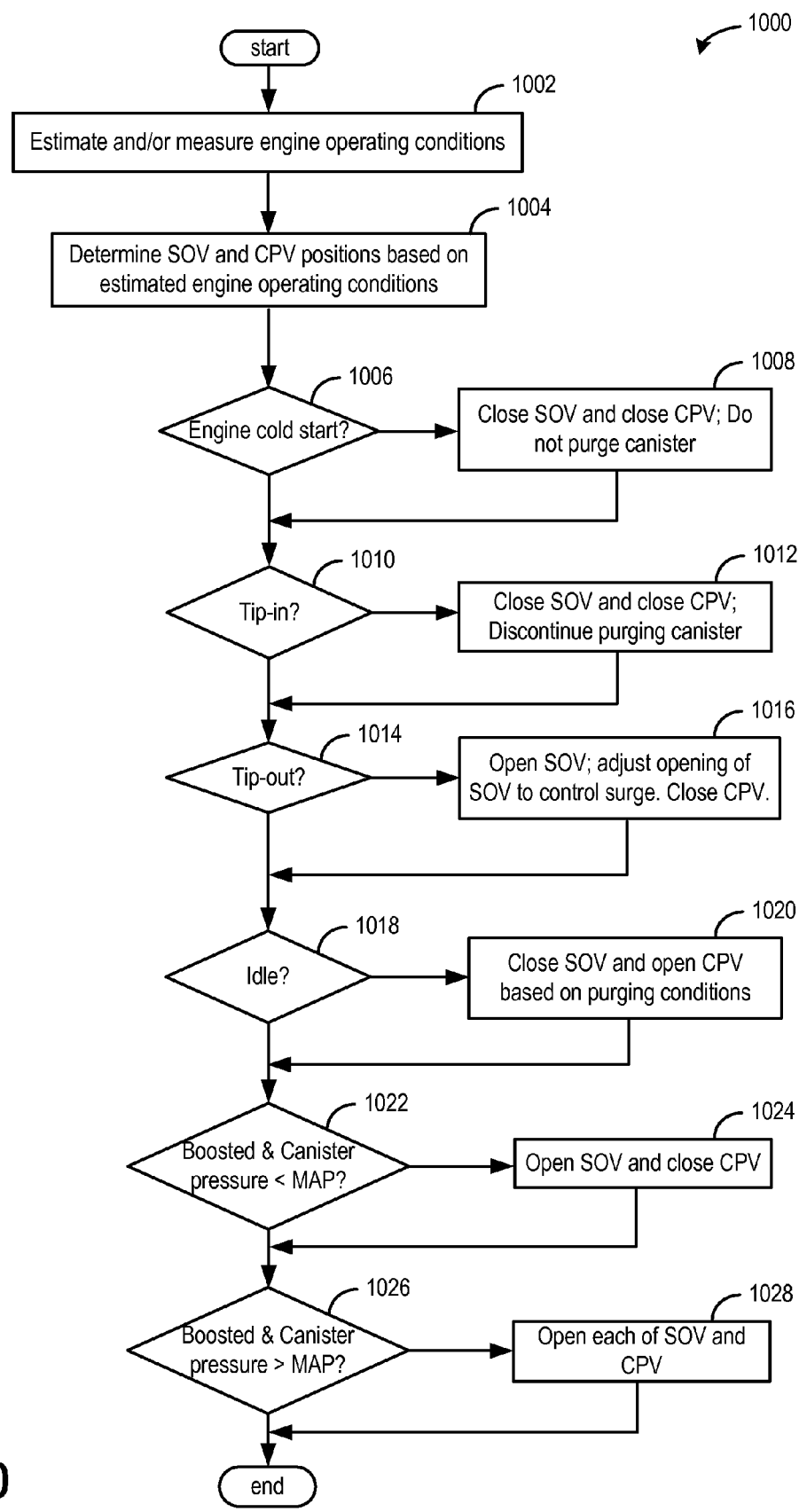
FIG. 10 presents a high level flowchart for operating a shut-off valve and a canister purge valve in the example engine system of FIG. 7.
Figure 11:
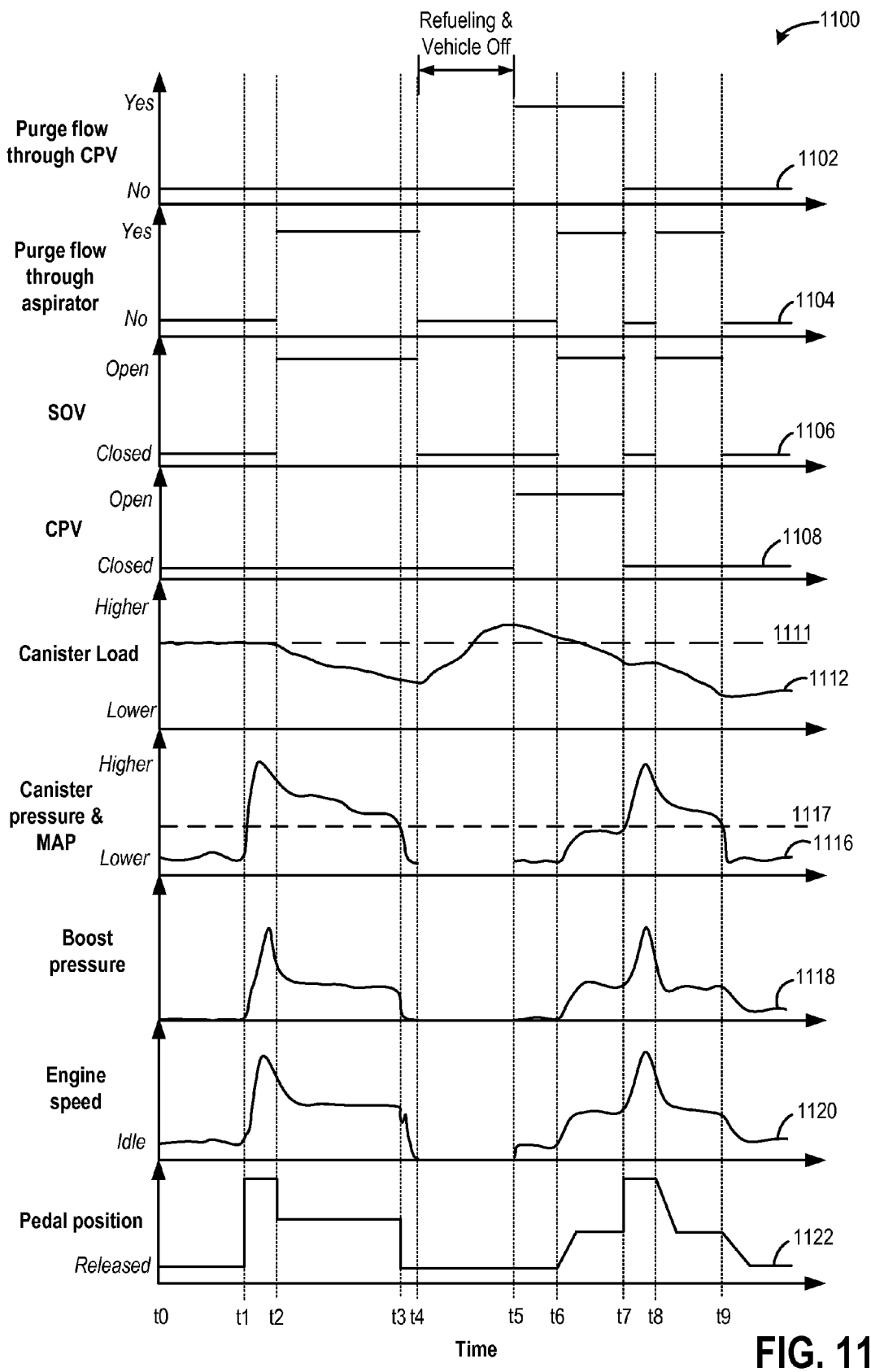
FIG. 11 is an example purging operation in the example engine system of FIG. 7

The following detailed description relates to systems and methods for improving a purging of a fuel vapor canister included in an engine system, such as the engine system of FIG. 1. The engine system may be a boosted engine including a turbine and a compressor. The fuel vapor canister may be coupled to an engine intake via a canister purge valve, the canister purge valve including a solenoid valve and a sonic choke housed within a common container of the canister purge valve. Stored fuel vapors in the fuel vapor canister may be purged via two paths into an intake of the engine. During non-boosted conditions, fuel vapors may be purged via the solenoid valve and through the sonic choke of the canister purge valve into an intake manifold (FIG. 2). During boosted conditions, fuel vapors from the fuel vapor canister may be purged through the solenoid valve of the canister purge valve, circumventing the sonic choke, into an aspirator coupled to a bypass passage around the compressor (FIG. 2). Herein, the fuel vapors may be delivered to an inlet of the compressor and thereon into the intake manifold. A shut-off valve coupled in a compressor bypass passage may be adjusted to enable purge flow via the aspirator (FIG. 4). Further, if a pressure of the fuel vapor canister is higher than intake manifold pressure, purged fuel vapors may also flow via the sonic choke directly into the intake manifold (FIG. 3). An example purge operation is depicted in FIG. 5 based on various engine and canister conditions. As such, by coupling the aspirator directly to an outlet of the solenoid valve, and bypassing the sonic choke, an increased purge flow rate may be attained via the aspirator (FIG. 6). An alternative engine embodiment may comprise fluidically coupling a suction port of the aspirator directly to the fuel vapor canister (FIG. 7) without including the canister purge valve in the coupling. Herein, the fuel vapor canister may fluidically communicate with each of the aspirator and the canister purge valve. Stored fuel vapors in the fuel vapor canister may be purged via two paths into an intake of the engine based on engine conditions (FIGS. 8 and 9). Similar to the example engine system of FIG. 1, motive flow rate through the aspirator, and aspirator vacuum, may be regulated by the shut-off valve in the bypass passage around the compressor. The canister purge valve and the shut-off valve in the bypass passage may be activated open or closed based on various transient engine conditions (FIG. 10). An example purge operation for the alternative embodiment of FIG. 7 is depicted in FIG. 11. In this way, canister purging may be enhanced.

Referring now to FIG. 1, it shows aspects of an example engine system 100 which may be included in an automotive vehicle. The engine system is configured for combusting fuel vapor accumulated in at least one component thereof. Engine system 100 includes a multi-cylinder internal combustion engine, generally depicted at 102, which may propel the automotive vehicle. Engine 102 may be controlled at least partially by a control system including a controller 112 and by input from a vehicle operator 130 via an input device 132. In this example, input device 132 includes an accelerator pedal and a pedal position sensor 134 for generating a proportional pedal position signal PP.

Engine 102 includes an intake throttle 165 fluidly coupled to an intake manifold 144 along an intake passage 142. Air may enter intake passage 142 from an air intake system (AIS) including an air cleaner 133 in communication with the vehicle's environment. Intake throttle 165 may include throttle plate 192. In this particular example, the position of throttle plate 192 may be varied by controller 112 via a signal provided to an electric motor or actuator included with intake throttle 165, a configuration that is commonly referred to as electronic throttle control (ETC). In this manner, intake throttle 165 may be operated to vary the intake air provided to intake manifold 144 and the plurality of cylinders therein.

A barometric pressure sensor 196 may be coupled at an inlet of intake passage 142 for providing a signal regarding barometric pressure (BP). A manifold air pressure sensor 162 may be coupled to intake manifold 144 for providing a signal regarding manifold air pressure (MAP) to controller 112. A throttle inlet pressure sensor 161 may be coupled immediately upstream of intake throttle 165 for providing a signal regarding throttle inlet pressure (TIP) or boost pressure.

Intake manifold 144 is configured to supply intake air or an air-fuel mixture to a plurality of combustion chambers 30 (also termed, cylinders 30) of engine 102. The combustion chambers 30 may be arranged above a lubricant-filled crankcase (not shown), in which reciprocating pistons of the combustion chambers rotate a crankshaft (not shown). Combustion chambers 30 may be supplied one or more fuels via fuel injectors 66. Fuels may include gasoline, alcohol fuel blends, diesel, biodiesel, compressed natural gas, etc. Fuel may be supplied to the combustion chambers via direct injection (as shown in FIG. 1), port injection, throttle valve-body injection, or any combination thereof. It will be noted that a single fuel injector 66 is depicted in FIG. 1 and though not shown, each combustion chamber 30 may be coupled with a respective fuel injector 66. In the combustion chambers, combustion may be initiated via spark ignition and/or compression ignition. Further, exhaust gases from combustion chambers 30 may exit engine 102 via an exhaust manifold (not shown) into an emission control device (not shown) coupled to an exhaust passage (not shown).

Engine system 100 may further include a compressor 114 for providing a boosted intake air charge to intake manifold 144. In the example of a turbocharger compressor, compressor 114 may be mechanically coupled to and driven by an exhaust turbine (not shown) powered by exhaust gases flowing from the engine. The exhaust turbine may be positioned in the exhaust passage and may be driven by exhaust gases. A wastegate (not shown) may be coupled across the exhaust turbine of the turbocharger. Specifically, the wastegate may be included in a bypass passage coupled between an inlet and outlet of the exhaust turbine. By adjusting a position of the wastegate, an amount of boost provided by the exhaust turbine may be controlled.

Alternatively, compressor 114 may be any suitable intake-air compressor, such as a motor-driven supercharger compressor.

In the configuration illustrated in FIG. 1, compressor 114 draws fresh air from air cleaner 133 and flows compressed air through intercooler 143. The intercooler may also be termed a charge air cooler. As such, each of compressor 114 and intercooler 143 are positioned upstream of intake throttle 165. The intercooler 143 cools the compressed air, which then flows via intake throttle 165 to intake manifold 144, depending on the position of throttle plate 192 of intake throttle 165. A compressor inlet pressure sensor 160 is coupled immediately upstream of the compressor 114 for providing a signal regarding compressor inlet pressure (CIP) to controller 112.

A bypass passage may be coupled across compressor 114 to divert a portion of intake air compressed by compressor 114 back upstream of the compressor into the compressor inlet. The bypass passage may be formed by first passage 186 and second passage 191, and also includes an aspirator 180, positioned as shown in FIG. 1. Aspirators (which may alternatively be referred to as ejectors, venturi pumps, jet pumps, and eductors) are passive devices which provide low-cost vacuum generation when utilized in engine systems. As such, aspirator 180 may be an ejector, an eductor, a venturi, a jet pump, or similar passive device.

As depicted in the example of FIG. 1, a first end 145 of first passage 186 may be coupled to intake passage 142 downstream of air cleaner 133 and upstream of compressor 114. A second end 147 of first passage 186 may be coupled with second passage 191 via aspirator 180. As such, second end 147 of first passage 186 may be coupled to a motive outlet of aspirator 180. In other words, the motive outlet of aspirator 180 may be coupled to intake passage 142 upstream of compressor 114 and upstream of CIP sensor 160 via first passage 186. Therefore, motive flow of compressed air from downstream of the compressor 114 mixed with other fluids that may be drawn into the aspirator via suction may be streamed into intake passage 142 at a location upstream of the compressor and downstream of air cleaner 133 (e.g. at first end 145).

Further, a first end 151 of second passage 191 may fluidically communicate with intake passage 142 downstream of compressor 114, downstream of intercooler 143, and upstream of intake throttle 165. A second end 149 of second passage 191 may be coupled to a motive inlet of aspirator 180 and therethrough to first passage 186. Thus, the motive inlet of aspirator 180 may fluidically communicate with intake passage 142 at a point that is downstream of compressor 114, downstream of intercooler 143, and upstream of intake throttle 165. In alternative embodiments, the motive inlet of aspirator 180 may be fluidically coupled to the intake passage 142 downstream of compressor 114 but upstream of intercooler 143.

An amount of air diverted through the bypass passage formed by first passage 186 and second passage 191 may depend upon relative pressures within the engine system. Alternatively, as shown in the depicted embodiment, a shut-off valve 185 may be included in second passage 191 between first end 151 and second end 149 to regulate the flow of compressed air into the compressor bypass passage. As shown, shut-off valve (SOV) 185 is positioned upstream (relative to the flow of compressed air in the compressor bypass passage) of ejector 180. To elaborate, SOV 185 is located in the compressor bypass passage at a position that is upstream of the motive inlet of ejector 180, the motive inlet of ejector 180 coupled to second end 149 of second passage 191. No other components are placed between the ejector and SOV 185. Herein, a position of shut-off valve 185 may regulate the amount of air flowing through the bypass passage. By controlling shut-off valve 185, and varying an amount of air diverted through the bypass passage, a boost pressure provided downstream of the compressor can be regulated. This enables boost control and also controls compressor surge. Further, when air is diverted through passages 186 and 191, vacuum may be generated at ejector 180 for a variety of purposes including drawing fuel vapors from a canister via a canister purge valve, applying vacuum to a vacuum consumption device such as a brake booster, or for storage in a vacuum reservoir. SOV 185 may be a binary on/off valve or may be a continuously variable valve capable of assuming positions between fully-closed and fully-open.

Engine system 100 further includes fuel system 40 comprising fuel tank 126, fuel vapor canister 122, and other components which will be described further below. Fuel tank 126 stores a volatile liquid fuel that may be delivered via fuel injector 66 to combustion chambers 30 in engine 102. To avoid emission of fuel vapors from the fuel tank 126 into the atmosphere, the fuel tank 126 is vented to the atmosphere through fuel vapor canister 122. Fuel vapor canister may also be referred to as an adsorbent canister, a fuel system canister, a charcoal canister, or simply, a canister, in the rest of this description. Fuel vapor canister 122 may have a significant capacity for storing hydrocarbon-, alcohol-, and/or ester-based fuels in an adsorbed state. The adsorbent canister may be filled with activated carbon granules and/or another high surface-area material, for example, to adsorb fuel vapors received from the fuel tank. Nevertheless, prolonged adsorption of fuel vapor will eventually reduce the capacity of the adsorbent canister for further storage and may result in bleed emissions. Therefore, the adsorbent canister may be periodically purged of adsorbed fuel vapors, as further described hereinafter. While a single fuel vapor canister 122 is shown in FIG. 1, it will be appreciated that any number of canisters may be coupled in engine system 100.

A vapor blocking valve (VBV) 124 (also termed, fuel tank isolation valve 124) may be optionally included in a conduit between fuel tank 126 and fuel vapor canister 122. In some embodiments, VBV 124 may be a solenoid valve, and operation of VBV 124 may be regulated by adjusting a driving signal (or pulse width) of the dedicated solenoid. During normal engine operation, VBV 124 may be kept closed to limit the amount of diurnal vapors directed to canister 122 from fuel tank 126. During refueling operations, and selected purging conditions, VBV 124 may be temporarily opened to direct fuel vapors from the fuel tank 126 to canister 122. By opening the fuel tank isolation valve (FTIV) 124 during conditions when the fuel tank pressure is higher than a threshold pressure (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 124 positioned in a passage between the fuel tank and canister, in alternate embodiments, the FTIV may be mounted on fuel tank 126.

One or more pressure sensors 128 may be coupled to fuel tank 126 for estimating a fuel tank pressure or vacuum level. While the depicted example shows a pressure sensor coupled to fuel tank 126, in alternate embodiments, pressure sensor 128 may be coupled between the fuel tank and VBV 124.

Fuel vapors released from canister 122 during a purging operation may be directed into intake manifold 144 via purge conduit 119. The flow of vapors along purge conduit 119 may be regulated by canister purge valve 164, coupled between the fuel system canister and the engine intake. The quantity and rate of vapors released by the canister purge valve may be determined by the duty cycle of an associated canister purge valve solenoid (not depicted). As such, the duty cycle of the canister purge valve solenoid may be determined by the vehicle's powertrain control module (PCM), such as controller 112, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge conduit 119 to prevent intake manifold pressure from flowing gases in the opposite direction of the purge flow. As such, the optional canister check valve may be included if the canister purge valve control is not accurately timed or the canister purge valve itself can be forced open by a high intake manifold pressure. An estimate of the manifold airflow (MAF) may be obtained from a MAF sensor (not shown) coupled to intake manifold 144, and communicated with controller 112. Alternatively, MAF may be inferred from alternate engine operating conditions, such as mass air pressure (MAP), as measured by a MAP sensor 162 coupled to the intake manifold.

In the configuration shown in FIG. 1, canister purge valve 164 is a three-port canister-purge valve (CPV) that controls the purging of fuel vapors from the canister into the intake manifold, along each of first purge line 182 and second purge line 184. First purge line 182 fluidically couples CPV 164 to intake manifold 144. Second purge line 184 fluidically couples CPV 164 to aspirator 180 and thereon, to intake passage 142 upstream of compressor 114. Second purge line 184 is fluidically coupled to an entraining inlet 194 of ejector 180 via second check valve 150. Entraining inlet 194 of ejector 180 may also be termed suction port 194 of ejector 180.

CPV 164, which is depicted schematically in FIG. 1, comprises a solenoid valve 172 and a flow restriction 174. In the depicted example, flow restriction 174 may be a sonic choke 174. It will be noted that the solenoid valve 172 and the sonic choke 174 may be positioned within a single, common housing of CPV 164. In other words, solenoid valve 172 and sonic choke 174 may be located within the same housing of the CPV 164. It will also be noted that sonic choke 174 is positioned proximate to solenoid valve 172 within CPV 164. It may be further noted that the CPV may include valves other than solenoid valves and flow restrictions other than sonic chokes without departing from the scope of the present disclosure. Sonic choke 174 may also be termed sonic nozzle 174.

As depicted in FIG. 1, flow restriction 174 (or sonic choke 174) is positioned downstream of solenoid valve 172 such that an inlet of sonic choke 174 fluidically communicates with an outlet of solenoid valve 172. An outlet of sonic choke 174 is fluidically coupled to intake manifold 144 via a first check valve 152. As shown, first purge line 182 fluidically couples the outlet of sonic choke 174 to intake manifold 144 downstream of intake throttle 165.

A sonic choke is a special kind of flow restriction that results in a substantially fixed flow rate for a vacuum deeper than 15-20 kPa. The sonic choke has an ability of pressure recovery that makes it different from an orifice without pressure recovery. Without pressure recovery, choked flow may occur at vacuum deeper that 52 kPa, assuming an upstream pressure is 100 kPa.

The three ports in CPV 164 include an inlet port 166 fluidically communicating with the fuel vapor canister 122 via purge conduit 119, a first outlet port 168 fluidically coupled with the intake manifold via first purge line 182, and a second outlet port 170 fluidically coupled with the entraining inlet 194 of ejector 180 via second purge line 184. The second outlet port 170 may be fluidically coupled between the outlet of solenoid valve 172 and the inlet of sonic choke 174 (as shown in FIG. 1) at a tap 178. Thus, ejector 180 may tap purge flow from between the outlet of solenoid valve 172 and the inlet of sonic choke 174. If second outlet port 170 were capped, the three-port CPV may be functionally equivalent to a two-port CPV.

Opening or closing of CPV 164 is performed via actuation of solenoid valve 172 by controller 112. Specifically, a pulse width modulated (PWM) signal may be communicated to the solenoid valve 172 in CPV 164 during a canister purging operation. In one example, the PWM signal may be at a frequency of 10 Hz. In another example, the solenoid valve 172 may receive a PWM signal of 20 Hz.

When CPV 164 is open, depending on relative pressure levels within the engine system, purge flow may enter the inlet port 166 and then continue either into the entraining inlet 194 of ejector 180, or into the intake manifold via first purge line 182 after passing through flow restriction 174. During certain conditions, purge flow may occur along both purge paths (e.g. first purge line 182 and second purge line 184) simultaneously. In contrast to conventional CPVs, which may include a flow restriction such as a sonic choke positioned intermediate the solenoid valve and any outlet port(s), purge flow exiting solenoid valve 172 of CPV 164 may not be restricted before exiting the second outlet port 170. To elaborate, purge flow through CPV 164 via solenoid valve 172 and via second purge line 184 may not be restricted before entering entraining inlet 194 of ejector 180 after exiting the second outlet port 170 in the CPV embodiment shown in FIG. 1. Put another way, CPV 164 does not include a flow restriction in the purge path leading from the outlet of the solenoid valve 172 to the second outlet port 170 of the CPV, which in turn communicates fluidically with suction port 194 of ejector 180. Thus, flow which exits the outlet of solenoid valve 172 and then enters entraining inlet 194 of ejector 180 may not be regulated in any way. As such, an amount of purge flow via the aspirator 180 may be smaller (than purge flow along first purge line 182) due to a lower pressure difference between outlet of solenoid valve 172 and suction port 194 of ejector 180. Any flow restriction in the purge path via aspirator 180, specifically upstream of suction port 194, may negatively affect purge flow rate. By not positioning a sonic choke (or any flow restrictor) between second outlet port 170 and suction port 194, an improved purge flow rate may be enabled via the aspirator 180.

A second check valve 150 is positioned in second purge line 184 immediately downstream of second outlet port 170. Purged vapors may, therefore, flow only in the direction from second outlet port 170 of CPV 164 towards entraining inlet 194 of ejector 180 and not in the opposite direction. Second check valve 150 effectually obstructs fluid flow from aspirator 180 into second outlet port 170 of CPV 164.

The position of second check valve 150 may be such that a volume included between second check valve 150 and the outlet of solenoid valve 172 is reduced. In one example, the volume may be minimized to enhance canister purge valve performance. Canister purge valve performance may be determined by comparing a slope and offset of a quantity of purged vapors flowing through the solenoid valve 172 versus an applied pulse duration to the solenoid valve 172. By reducing the volume included between the outlet of solenoid valve 172 and second check valve 150, canister purge valve performance may be maintained and/or improved. In one example, a volume included between the outlet of solenoid valve 172 and inlet of sonic choke 174 may be zero. This may ensure that purge flow through the sonic choke 174 and ejector 180 is marginally influenced by the changing number of moles resident in this region.

In contrast to the purge flow along second purge line 184, purge flow along first purge line 182 may be restricted by sonic choke 174. The sonic choke restriction may enable a more accurate metering of flow rate. Purged vapors exiting the outlet of solenoid valve 172 encounter flow restriction 174 of CPV 164 before flowing directly into intake manifold 144. Alternatively, the purge vapors may first enter the suction port 194 of aspirator 180 before flowing into the intake manifold 144. As such, a higher pressure difference may exist between the outlet of solenoid valve 172 and the intake manifold 144 than that between the outlet of solenoid valve 172 and suction port 194 of ejector 180. This higher pressure difference may result in substantial purge flow into the intake manifold when CPV 164 is opened which may significantly alter the amount of fuel entering combustion chambers 30. As a result, air-fuel ratio, combustion efficiency, and emissions may be unfavorably affected. By positioning the sonic choke 174 downstream of solenoid valve 172, purge flow may be regulated and metered into the intake manifold 144 at a steady flow rate. Further, fuel injection via fuel injectors may be adjusted more accurately if purged fuel vapors enter the intake manifold at a steady flow rate allowing enhanced control of air-fuel ratio, emissions, and engine performance. A first check valve 152 coupled in first purge line 182 prevents backflow from intake manifold 144 into canister 122, and allows fluid flow only from first outlet port 168 of CPV 164 towards intake manifold 144. As depicted, first check valve 152 may be positioned downstream of the outlet of sonic choke 174.

Fuel system 40 may be operated by controller 112 in a plurality of modes by selective adjustment of the various valves and solenoids. For example, the fuel system may be operated in a fuel vapor storage mode wherein the controller 112 may close CPV 164 and open canister vent valve 120 and FTIV 124 to direct refueling and diurnal vapors into canister 122 while preventing fuel vapors from being directed into the intake manifold. In this mode, air stripped of fuel vapors may be streamed from canister 122 to the atmosphere through canister vent valve 120 and vent 117.

As another example, the fuel system may be operated in a refueling mode (e.g., when fuel tank refueling is requested by a vehicle operator), wherein the controller 112 may adjust the valves to depressurize the fuel tank before enabling fuel to be added therein. Therein the controller 112 may close canister vent valve (CVV) 120 and open each of CPV 164 and FTIV 124 to direct excess fuel tank pressure/vacuum into the intake manifold via the canister.

As yet another example, the fuel system may be operated in a canister purging mode (e.g., when canister is saturated, an emission control device has attained light-off temperature, and with the engine running), wherein the controller 112 may open CPV 164, CVV 120, and close FTIV 124. By closing the FTIV, the canister can be purged more efficiently. During this mode, vacuum generated either by the intake manifold or by the aspirator may be used to draw fresh air through vent 117 and through fuel system canister 122 to purge the stored fuel vapors into intake manifold 144. In this mode, the purged fuel vapors from the canister, along with air drawn from the atmosphere to enable purging, are combusted in the engine. The purging may be continued until the stored fuel vapors amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel system canister. Alternatively, in one example, one or more sensors 138 may be coupled to the canister 122 to provide an estimate of a canister load (that is, an amount of fuel vapors stored in the canister). As an example, sensor 138 may be a pressure sensor providing an estimate of canister pressure or canister load. In another example, the fuel system canister load may be based on the number and duration of refueling events that have occurred following a previous canister purging event. Based on the canister load, and further based on engine operating conditions, such as engine speed-load conditions, a purge flow rate may be determined. While sensor 138 is shown directly coupled to the canister in FIG. 1, other embodiments may position sensor 138 downstream of the canister, or in other locations, without departing from the scope of the present disclosure.

During the purging mode, vapors stored in fuel vapor canister 122 may be purged to intake manifold 144 by opening solenoid valve 172 of CPV 164. For example, as detailed earlier, vapors may be purged directly to intake manifold 144 via first purge line 182, or indirectly to intake manifold 144 via second purge line 184. Purging along the second purge line 184 into intake manifold 144 may occur after entering the entraining inlet 194 of ejector 180 and then flowing in first passage 186 to intake passage 142 which ultimately leads to intake manifold 144. As will be detailed below, the path taken by vapors purged from the canister may depend upon a state of the shut-off valve 185, when present, as well as on relative pressures within engine system 100.

Motive flow through ejector 180 generates a suction flow at the entraining inlet 194 of ejector 180, thereby generating vacuum which may be used to draw purged fuel vapors via CPV 164. Suction port 194 may be located at a neck of aspirator 180, and therefore, vacuum may be drawn at the neck of the aspirator 180. As such, ejector 180 is a three-port device, coupled to the compressor bypass passage, including a motive inlet port, a mixed flow or motive outlet port, and an entraining inlet port. As mentioned earlier, suction port 194 of aspirator 180 fluidically communicates with second outlet port 170 of CPV 164 via second check valve 150. Motive inlet of aspirator 180 may be fluidically coupled to second end 149 of second passage 191, and may receive compressed air from downstream of compressor 114. As such, motive inlet of aspirator 180 may be fluidically coupled to intake passage 142 at a location downstream of compressor 114, and in some embodiments, may also be coupled downstream of intercooler 143. Motive outlet of aspirator 180 may be fluidically coupled to second end 147 of first passage 186. Thus, motive outlet of ejector 180 may fluidically communicate with intake passage 142 via first passage 186 at a location upstream of compressor 114. During conditions when motive flow passes through ejector 180, a mixture of the fluid flow from the motive inlet and the entraining inlet 194, referred to herein as mixed flow, exits the mixed flow outlet. In one example, mixed flow exiting the mixed flow outlet may be a combination of compressed air and purged fuel vapors.

As explained earlier, ejector 180 may be actuated by shut-off valve 185. Shut-off valve 185 may be a solenoid valve which is actuated electrically, and the state of shut-off valve 185 may be controlled by controller 112 based on various engine operating conditions. However, as an alternative, shut-off valve 185 may be a pneumatic (e.g., vacuum-actuated) valve; in this case, the actuating vacuum for shut-off valve 185 may be sourced from the intake manifold and/or a vacuum reservoir and/or other low pressure sinks of the engine system. In embodiments where the shut-off valve is a pneumatically-controlled valve, control of the shut-off valve may be performed independent of a powertrain control module (e.g., shut-off valve 185 may be passively controlled based on pressure/vacuum levels within the engine system).

Whether shut-off valve 185 is actuated electrically or with vacuum, it may be either a binary valve (e.g., a two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable shut-off valve may provide greater flexibility in control of the motive flow through ejector 180, with the drawback that continuously variable valves may be much more costly than binary valves. In other examples, shut-off valve 185 may be a gate valve, pivoting plate valve, poppet valve, or another suitable type of valve.

The state of shut-off valve 185 may be adjusted based on various engine operating conditions, to vary the motive flow through ejector 180. As used herein, a state of shut-off valve 185 may be fully open, partially open (to varying degrees), or fully closed. In one example, the state of shut-off valve 185 may be adjusted based on intake manifold pressure. In another example, the state of shut-off valve 185 may be adjusted based on a desired engine air flow amount and/or rate. In yet another example, the position of shut-off valve 185 may be based upon a desired boost level. It will be appreciated that references to adjustment of shut-off valve 185 may refer to either active control via controller 112 (e.g., as in an where shut-off valve 185 is a solenoid valve) or passive control based on a vacuum actuation threshold of the shut-off valve (e.g., in embodiments where shut-off valve 185 is a vacuum-actuated valve). By varying the motive flow through ejector 180 via adjustment of the state of shut-off valve 185, an amount of vacuum drawn at the entraining inlet of ejector 180 may be modulated to meet vacuum requirements.

It will be appreciated that in some embodiments, first check valve 152 may not be included in first purge line 182 when shut-off valve 185 is present. When first check valve 152 is not included in first purge line 182, during boosted conditions and with shut-off valve 185 at least partially open to generate a vacuum via aspirator 180, boosted air may flow in a reverse direction through first purge line 182 towards solenoid valve 172. Herein, even if solenoid valve 172 is opened, the boosted air may preferentially leak towards suction port 194 of aspirator 180 relative to flowing towards fuel vapor canister 122. Further, during boosted conditions, manifold pressure may be lower than throttle inlet pressure such that by maintaining shut-off valve in at least a slightly open position, ejector 180 may continue to generate a vacuum to draw any reverse flow into CPV 164 from intake manifold 144. In cases when ejector driving pressure is lower, manifold pressure will be likewise lower reducing reverse flow into CPV 164. Further still, in some examples, reverse flow through sonic choke 174 may be substantially lower than forward flow through sonic choke 174 because of a lower discharge coefficient.

It will also be appreciated that vacuum generated by aspirator 180 may be used for additional purposes other than drawing purge flow, without departing from the scope of this disclosure. For example, aspirator generated vacuum may be stored in a vacuum reservoir. In another example, vacuum from the ejector may be used in a brake booster.

Controller 112 may be configured as a microcomputer including a microprocessor unit, input/output ports, an electronic storage medium for executable programs and calibration values, random access memory, keep alive memory, and a data bus. Controller 112 may receive various signals from sensors 116 coupled to engine 102 such as BP sensor 196, MAP sensor 162, CIP sensor 160, TIP sensor 161, etc. Furthermore, controller 112 may monitor and adjust the position of various actuators 118 based on input received from the various sensors 116. These actuators may include, for example, intake throttle 165, intake and exhaust valve systems, solenoid valve 172 of CPV 164, canister vent valve 120, FTIV 124, shut-off valve 185. Storage medium read-only memory in controller 112 can be programmed with computer readable data representing instructions executable by a processor for performing the routines described below, as well as other variants that are anticipated but not specifically listed. Example routines are described herein with reference to FIGS. 2, 3, and 4.

Thus, an example engine system may comprise a canister purge valve comprising a solenoid valve and a sonic choke, the sonic choke coupled downstream of the solenoid valve, an inlet of the sonic choke fluidically coupled to an outlet of the solenoid valve, an outlet of the sonic choke fluidically coupled with an intake manifold via a first check valve, a fuel vapor canister fluidically communicating with an inlet of the canister purge valve via a first port, an ejector coupled in a compressor bypass passage, the compressor bypass passage including a shut-off valve, a suction port of the ejector fluidically communicating with a second port of the canister purge valve via a second check valve, the second port positioned between the outlet of the solenoid valve and the inlet of the sonic choke, a motive inlet of the ejector coupled to an intake passage downstream of a compressor, and a motive outlet of the ejector coupled to the intake passage upstream of the compressor. Further, the shut-off valve in the compressor bypass passage may control motive flow through the ejector. As such, the solenoid valve and the sonic choke may be positioned within a single, common housing of the canister purge valve.

Furthermore, the first check valve (e.g. first check valve 152) may be absent when the shut-off valve is present such that the outlet of the sonic choke is directly coupled to the intake manifold. The outlet of the sonic choke may be coupled to the intake manifold downstream of an intake throttle. Further, the compressor may be positioned upstream of the intake throttle.

Turning now to FIG. 2, it depicts an example routine 200 for performing a canister purging based on whether boosted conditions are present or absent in an engine system, such as engine system 100 of FIG. 1. Specifically, during non-boosted conditions, purged fuel vapors may be directed into the intake manifold via the sonic choke. During boosted conditions, depending on canister pressure and manifold pressure, purged fuel vapors may be directed into an inlet of the compressor, and/or into the intake manifold.

At 202, engine operating parameters such as torque demand, engine speed, barometric pressure (BP), MAP, air-fuel ratio, etc. may be estimated and/or measured. For example, manifold pressure may be sensed via a manifold pressure sensor (e.g. sensor 162 in FIG. 1). Further, air-fuel ratio may be measured by an output of an exhaust sensor coupled to the exhaust manifold in the engine.

At 204, routine 200 may determine if purging conditions are met. Purging conditions may be confirmed based on various engine and vehicle operating parameters, including an amount of hydrocarbons stored in canister 122 being greater than a threshold, the temperature of an emission catalyst being greater than a threshold, fuel temperature, the number of engine starts since the last purge operation (such as the number of starts being greater than a threshold), a duration elapsed since the last purge operation, fuel properties, and various others. An amount of fuel vapors stored in the fuel system canister may be measured based on one or more sensors in the emission control system (e.g. sensor 138 coupled to fuel vapor canister 122 of FIG. 1) or estimated based on a learned vapor amount/concentration at the end of a previous purging cycle. The amount of fuel vapors stored in the fuel system canister may be further estimated based on engine and vehicle operating conditions including a frequency of refueling events and/or frequency and duration of previous purging cycles. If purging conditions are not confirmed and not met, routine 200 progresses to 206 to not perform the purging routine, and routine 200 ends. In alternative embodiments, a purging routine may be initiated by the controller based on existing engine conditions. For example, if the emission treatment device has achieved light-off, purging may be initiated even when canister load is less than the threshold load to further reduce stored hydrocarbon levels.

If purging conditions are met at 204, routine 200 continues to 208 to determine whether boost conditions are present or not. In one example, a boost condition may be confirmed when throttle inlet pressure is higher than an atmospheric pressure. Throttle inlet pressure or boost pressure may be measured by TIP sensor 161 of FIG. 1. In another example, boost conditions may be confirmed if one or more of a higher engine load and a super-atmospheric intake condition is/are present.

If boost conditions are not determined at 208, the engine may be in a non-boosted condition, such as an engine idling condition. During non-boosted conditions, pressure in the intake manifold may be low enough to draw purged fuel vapors through the first purge line 182. Thereupon, routine 200 proceeds to 210 to adjust positions of various valves for purge flow. Accordingly, the canister vent valve (e.g. CVV 120) may be opened (from a closed position) at 212, the FTIV (if present) may be closed (from an open position) at 214, and the CPV (e.g. CPV 164 of FIG. 1) may be opened at 216. The shut-off valve in the compressor bypass passage (e.g. SOV 185) may also be closed at 217 during non-boosted conditions.

As such, opening of CPV 164 includes communicating a pulse width modulated signal to solenoid valve 172 which may be pulsed in an open/closed mode. Solenoid valve 172 may be a fast response valve. In one example, the solenoid valve may be pulsed at 10 Hz. The pulse width modulated signal may vary the duration of open valve time to control an average purge flow rate. Further, the opening and closing of the solenoid valve may be synchronized with engine cylinder combustion events. As will be noted, the solenoid valve in the CPV can be visualized as a gaseous fuel injector which injects fuel vapors (from a canister) along with air (from atmosphere to enable purging) into the engine intake. Thus, engine 102, in the depicted example, may include a gaseous fuel injector to serve all combustion chambers 30. In other embodiments, improved performance may be brought about by including a gaseous fuel injector (such as CPV 164) for each combustion chamber.

With the opening of CVV and the CPV, fuel vapors may flow (with air) from the fuel vapor canister through purge conduit 119, via solenoid valve 172, through sonic choke 174, past first check valve 152 (if present) in first purge line 182 into intake manifold 144 of engine system 100. Sonic choke 174 may enable flow metering under conditions when the intake manifold has at least 8 kPa of vacuum.

Thus, at 218, intake manifold vacuum may be utilized to draw air through the canister to allow desorption and purging of stored fuel vapors in the canister. Further, the intake vacuum may draw these desorbed and purged fuel vapors from the canister through the CPV. Flow of purged vapors through the CPV includes flowing the purged vapors through the solenoid valve, at 220, and then flowing these purged vapors through the sonic choke, at 222.

As depicted in FIG. 1, sonic choke 174 is positioned downstream of solenoid valve 172. Therefore, purged vapors may flow first through the solenoid valve 172 and later through sonic choke 174. Vapors flowing through sonic choke 174 may flow past first check valve 152 (if present) and then may stream into the intake manifold. Thus, at 224, purged vapors may be received from the sonic choke in the intake manifold downstream of the intake throttle (e.g. intake throttle 165). Further, these purged vapors may be delivered into combustion chambers for combustion. As such, during non-boosted conditions, there may be no purge flow through the aspirator since no vacuum may be generated therein.

Based on an amount of fuel vapors received in the manifold from the canister, engine fueling by fuel injectors may be adjusted. Accordingly, at 226, fuel injection timing and/or fuel injection amount may be modified based on the quantity of purged fuel vapors received from the canister in the intake manifold. In one example, the fuel injection amount and/or timing may be adjusted to maintain a cylinder air-fuel ratio at or close to a desired ratio, such as stoichiometry. For example, fueling via fuel injectors may be decreased as an amount of purged fuel vapors from the fuel vapor canister increases to maintain combustion at stoichiometry. In another example, fuel injection amount and/or timing may be modified to maintain engine combustion for torque. In yet another example, one or both of fuel injection timing and fuel injection amount may be varied to maintain each of engine torque and a stoichiometric air-fuel ratio. Furthermore, a sensor may determine an air-fuel ratio of exhaust gases exiting the engine and the determined air-fuel ratio may be compared with a desired air-fuel ratio. The controller may calculate an error based on a difference between the desired air-fuel ratio and the determined air-fuel ratio. Fuel injection from fuel injectors may, accordingly, be adjusted based on the calculated error.

Returning now to 208, if it is determined that boosted conditions are present, routine 200 continues to 228 to determine if canister pressure is greater than manifold pressure. Canister pressure may be substantially at or near atmospheric pressure when the CVV is opened. As such, the CVV may be largely maintained at an open position and may be closed only during a vacuum leak test. Accordingly, canister pressure may represent atmospheric pressure. If it is determined that canister pressure is greater than manifold pressure under boosted conditions, routine 200 may proceed to 230 to perform routine 300 of FIG. 3. Manifold pressure may be lower than canister pressure (or atmospheric pressure) based on a position of the intake throttle. For example, if the intake throttle is at a partly closed position, manifold pressure may be reduced relative to boost pressure (measured at throttle inlet) as well as atmospheric pressure.

Herein, purge flow may be streamed via both purge lines, e.g. first purge line 182 and second purge line 184, into the intake. Routine 300 will be described further below.

On the other hand, if it is confirmed that canister pressure is not greater than manifold pressure (MAP), routine 200 continues to 232 where different valves may be adjusted to enable purge flow through the aspirator. At 234, the CVV (e.g. CVV 120) may be opened (from a closed position) or maintained open to draw fresh air from the atmosphere into the canister. Next, at 236, the FTIV may be closed from an open position (if present) or may be maintained closed. Further, at 238, the CPV may be opened. As explained earlier in reference to 216, the CPV may be pulsed between open and closed positions at a given frequency.

Furthermore, a shut-off valve (e.g. SOV 185) may be opened (from a closed position) or may be maintained open at 240. As such, an opening of the shut-off valve may be adjusted to regulate flow of compressed air in the compressor bypass passage, and consequently regulate the generation of vacuum at the aspirator.

The controller may monitor engine conditions and may choose to open the shut-off valve when vacuum is desired. As an example, vacuum may be desired when vacuum levels in a vacuum reservoir drop below a threshold, during a purge operation, during a braking operation, etc. In one example, the shut-off valve may be a binary on-off valve wherein if vacuum is desired the shut-off valve is adjusted to an "on" position. If vacuum is not desired, or when boosted conditions are not present, the shut-off valve may be deactivated by adjusting to an "off" position. Alternatively, during an engine transient condition, specifically an operator tip-in event, the shut-off valve may be temporarily closed to enable a rapid increase in boost pressure.

At 240, the shut-off valve may be adjusted to an "on" (or open) position, if the shut-off valve is a binary valve. However, if the shut-off valve in the engine embodiment is a continuously variable type valve, the shut-off valve may be adjusted at 240 from a more closed position to a more open position. Alternatively, it may be adjusted from a mostly open position to a fully open position. In another example, the shut-off valve may be varied from a fully closed position to a fully open position. The opening of the shut-off valve may determine a level of vacuum generated at the aspirator. Further, the shut-off valve may be adjusted based on engine conditions as will be explained further in reference to FIG. 4 later.

With compressed air flowing through the ejector as a motive flow, vacuum may be generated in the aspirator that may be applied to the tap between the outlet of the solenoid valve and the inlet of the sonic choke in the CPV. Thus, during boosted conditions, purge vapors may flow from the canister 122, through the solenoid valve 172 in the CPV 164, past second check valve 150 into suction port 194 of the aspirator 180 coupled to the compressor bypass passage. Further, when manifold pressure is higher than canister pressure and the engine is operating under boosted conditions, purge flow through the sonic choke directly into the intake manifold may not occur.

At 242, compressed air may be streamed from downstream of the compressor 114 (and in the example of FIG. 1, downstream of intercooler 143) and upstream of intake throttle 165, through the aspirator 180, towards the compressor inlet. This motive flow of compressed air through the ejector generates a vacuum. At 244, vacuum may be drawn at the neck of the aspirator, and at 246, applied to the CPV downstream of the solenoid valve and upstream of the sonic choke.

The applied vacuum may draw purged vapors from the canister to the inlet of the compressor via the aspirator, at 248. At 250, purged vapors may be streamed through the solenoid valve 172 in the CPV. At 252, these vapors may then flow through the second check valve downstream of the tap (e.g. tap 178 in FIG. 1) between the outlet of the solenoid valve and the inlet of the sonic choke. Further, at 254, desorbed fuel vapors may not flow through the sonic choke.

These desorbed vapors may be received at the compressor inlet and may then flow into the intake manifold for combustion in the cylinders of engine 102. Based on the quantity of fuel vapors received from the canister, engine fueling may be adjusted at 226. Thus, an amount of fuel injected and/or fuel injection timing may be adjusted in response to an amount of fuel vapors received from the canister. In one example, the fuel injection amount and/or timing may be adjusted to maintain a cylinder air-fuel ratio at or close to a desired ratio, such as stoichiometry. For example, fuel injection amount may be decreased in response to an increase in fuel vapors received from the canister. Routine 200 may then end.

Referring now to FIG. 6, it presents map 600 illustrating a comparison between purge flow rates through an aspirator when the aspirator is coupled to an outlet of a sonic choke in a CPV and when the aspirator (e.g. aspirator 180) bypasses the sonic choke (e.g. sonic choke 174) and is fluidically coupled to an outlet of a solenoid valve (e.g. solenoid valve 172) in the CPV. Alternatively, the aspirator may be directly coupled to the fuel vapor canister, as will be described in reference to the example embodiment depicted in FIG. 7. Map 600 depicts suction flow rate along the y-axis and intake vacuum levels along the x-axis. Further, plot 602 in map 600 represents an example flow rate through a single CPV, such as CPV 164 of FIG. 1 (or CPV 163 of FIG. 7). Plots 604, 606, and 608 represent aspirator suction flow rates at different boost pressures. Specifically, plot 604 represents variation in suction flow rate at the aspirator at a first boost pressure, plot 606 represents variation in suction flow rate at the aspirator at a second boost pressure, and plot 608 indicates variation in suction flow rate at the aspirator at a third boost pressure. Herein, the first boost pressure (e.g. 60 kPa) may be the highest of the three depicted boost pressures, the second boost pressure (e.g. 40 kPa) may be lower than the first boost pressure but greater than the third boost pressure, and the third boost pressure (e.g. 5 kPa) may be lower than each of the first and the second boost pressures.

If vacuum generated by the ejector is applied to the outlet of the sonic choke in the CPV, purge flow rate through the ejector may be that indicated at the intersection of plot 602 and the ejector suction flow rate plots (e.g. 622, 624, and 628). On the other hand, if the vacuum from the ejector is directly applied to the canister (either at the outlet of the solenoid valve 172 of CPV 164, or directly to purge conduit 125 from the fuel vapor canister 122 as shown in FIG. 7), the purge flow rate through the ejector may be the maximum ejector flow rate shown on the graph where the plots of suction flow rates intersect the y-axis. For example, purge flow through the ejector at the first boost pressure when the ejector is coupled to the sonic choke of the CPV may be indicated by flow rate at 622 (e.g. intersection of plot 602 and plot 604). As shown in map 600, this flow rate may be SFL_3. If, on the other hand, the ejector were not coupled to the sonic choke and instead coupled to the solenoid valve (or directly to the canister), flow rate through the ejector at the first boost pressure may be SFL_1 where plot 604 intersects the y-axis at 632. As will be noted, flow rate SFL_1 is substantially higher than flow rate SFL_3. In another example, when the boost pressure is the third boost pressure, purge flow through the aspirator when it is coupled to the outlet of the sonic choke may be indicated by 628, intersection of plot 602 and plot 608. Thus, the flow rate may be SFL_6 as shown in map 600. However, the flow rate through the aspirator may be SFL_5 (flow rate at intersection of plot 608 with y-axis at 636) when the ejector is directly coupled to the solenoid valve, and bypassing sonic choke, at the third boost pressure. Again, flow rate SFL_5 is significantly higher than flow rate SFL_6 at 628. Likewise, ejector flow rates at the second boost pressure when the ejector is coupled to the sonic choke (flow rate SFL_4 at 624) may be considerably lower than flow rate (SFL_2) at the same boost pressure when the ejector is directly coupled either to the solenoid valve or the canister. Thus, by removing the sonic choke out of the purge flow path to the ejector, purge flow rate may be considerably increased. In one example, the purge flow rate (or suction flow rate) may be doubled. Further, this increase in the flow rate may occur at an engine condition when the engine can tolerate the extra fuel flow, e.g. boosted conditions.

Turning now to FIG. 3, it shows routine 300 illustrating an example purging via the sonic choke and the aspirator during boosted conditions. Specifically, when canister pressure is higher than manifold pressure (MAP), a purge operation may include flowing desorbed fuel vapors via each of the sonic choke and the aspirator.

At 302, routine 300 may determine if canister pressure is greater than manifold pressure in the engine intake manifold. In other words, it may be determined if manifold pressure is lower than canister pressure. As described earlier in reference to 228, canister pressure may be substantially equivalent to atmospheric pressure since the CVV is mostly maintained open. If canister pressure is determined to be lower than manifold pressure, routine 300 proceeds to 304 where it may not continue the purging method and ends. Herein, purging may occur only via the aspirator vacuum as described earlier in reference to routine 200 (232-254).

If canister pressure is confirmed to be greater than manifold pressure, routine 300 continues to 306 to adjust the positions of different valves for simultaneous purge flow via the sonic nozzle and the aspirator. At 308, the CVV (e.g. CVV 120) may be opened (from a closed position) or maintained open to draw fresh air from the atmosphere into the canister. Next, at 310, the FTIV (if present) may be closed from an open position or may be maintained closed. Further, at 312, the CPV may be opened. As explained earlier in reference to 216 and 238 of routine 200, the CPV may be pulsed open and closed at a given frequency. An example frequency may be 10 Hz. Further, at 314, a shut-off valve (SOV) in the compressor bypass passage may be opened. In one example, the SOV may be adjusted to an "on" position wherein the SOV may be at a fully open position. Herein, the SOV may be adjusted to a fully open position from a fully closed position. In another example, the controller may select a degree of opening of the SOV based on a desired vacuum level at the aspirator. Thus, the SOV may be opened from a closed position. As such, the SOV may be moved to a more open position from a more closed position. In another example, the SOV may be adjusted to a fully open position from a mostly closed position. In yet another example, the SOV may be opened to a slightly open position from a fully closed position. Other examples of SOV position adjustments are possible without departing from the scope of this disclosure.

Once the valves are adjusted to their positions, desorbed fuel vapors from the canister may concurrently flow through the sonic choke and via the aspirator. Accordingly, a first portion of fuel vapors may flow through the aspirator as follows: at 316, compressed air from downstream of the compressor and upstream of the intake throttle may be directed through the aspirator to the compressor inlet. This motive flow of compressed air through the aspirator enables a vacuum to be drawn at the neck of the aspirator, at 318, which may then be applied to the tap (e.g. tap 178 in FIG. 1) in the CPV. The vacuum may accordingly be applied downstream of the outlet of the solenoid valve and upstream of the inlet of the sonic choke in the CPV, at 320. At 322, this applied vacuum may draw the first portion of purged fuel vapors from the canister to the compressor inlet via the aspirator. To elaborate, at 324, fuel vapors from the canister may first flow through the solenoid valve in the CPV, and at 326, may next flow through the second check valve (e.g. second check valve 150) immediately downstream of the tap between the solenoid valve and the sonic choke in the CPV. Further, at 336, based on the amount of vapors received in the intake manifold, fuel injection amount and/or timing may be adjusted to maintain engine combustion at a desired air-fuel ratio, such as stoichiometry.

At the same time as the flow of the first portion of purged fuel vapors through the aspirator, additional (or a second portion of) fuel vapors from the fuel vapor canister may flow through the sonic choke in the CPV as follows: at 328, manifold pressure, being lower than canister pressure, may draw purge vapors from the canister through the sonic choke in the CPV. As 330, the vapors may stream first through the solenoid valve in the CPV, and then at 332, flow through the sonic choke positioned downstream of the solenoid valve.

Vapors may be received at 334 from the sonic choke directly in the intake manifold downstream of the intake throttle. Further, at 336, as mentioned earlier, engine fueling may be adjusted by modifying the fuel injection amount and/or timing to maintain stoichiometric combustion.

Thus, the described example embodiment may enable a more complete purging of a fuel vapor canister by providing an alternative and additional purge path for desorbed fuel vapors via an aspirator that is not encumbered by a flow restriction such as a sonic choke. Stored fuel vapors from the fuel system canister may flow into an engine intake during boosted conditions via the sonic choke and/or via the aspirator in the compressor bypass passage. Flow into the intake manifold via the sonic choke may occur only when canister pressure is higher than the manifold pressure. Purge flow through the aspirator may occur as long as a vacuum is generated by the aspirator during motive flow through the aspirator. Further, during non-boosted conditions such as engine idle, the aspirator may not generate sufficient vacuum. As such, during non-boosted conditions, vacuum in the intake manifold may draw desorbed vapors from the canister more easily. Since a higher pressure difference may be present between the canister and the intake manifold, purge flow may largely occur via the first purge line 182 through the solenoid valve and the sonic choke. Furthermore, the substantial pressure difference between canister pressure and manifold vacuum may produce a higher purge flow rate through the CPV that may be metered and regulated by the flow restriction e.g. the sonic choke.

Accordingly, an example method for a boosted engine may comprise during boosted conditions, adjusting an opening of a shut-off valve to regulate compressor bypass flow through an aspirator, drawing vacuum at the aspirator, and applying the vacuum downstream of a valve (e.g. solenoid valve 172 in FIG. 1) and upstream of a sonic choke (e.g. sonic choke 174 in FIG. 1) in a canister purge valve, wherein the valve and the sonic choke are positioned within a common housing in the canister purge valve. During boosted conditions, fuel vapors from a canister, such as a fuel vapor canister, may be drawn through the valve in the canister purge valve via the aspirator to a compressor inlet upstream of an intake throttle, and then into an intake manifold. The purge flow described above may occur during boosted conditions when intake manifold pressure is higher than a pressure in the canister. Further, fuel vapors from the canister may not be drawn into the intake manifold via the sonic choke during boosted conditions when intake manifold pressure is higher than a pressure in the canister. During boosted conditions, when intake manifold pressure is lower than a pressure in the canister, additional fuel vapors from the canister may be drawn into the intake manifold via the valve and the sonic choke in the canister purge valve. The example method may further comprise, during non-boosted conditions, applying vacuum from the intake manifold downstream of each of the valve and the sonic choke in the canister purge valve. Accordingly, fuel vapors from the canister may be drawn through each of the valve and the sonic choke in the canister purge valve into the intake manifold downstream of the intake throttle. Further, fuel vapors from the canister may not be drawn through the canister purge valve to the compressor inlet via the aspirator. Herein, the aspirator vacuum may not be generated or may not be sufficient to draw any purge flow via second purge line 184 of FIG. 1. As such, aspirator vacuum may not be generated by adjusting the shut-off valve in the compressor bypass passage to a closed position during non-boosted conditions.

FIG. 4 depicts an example routine 400 for adjusting a position of the shut-off valve (SOV), such as SOV 185 of FIG. 1, based on purging conditions and engine conditions. Specifically, the opening of the SOV may be adjusted based on initiation of boost, a canister load (e.g. based on refueling events), previous purge operations, and transient engine events.

At 402, routine 400 determines if boosted conditions are present. Boosted conditions may be determined to be present when boost pressure (or throttle inlet pressure) is significantly higher than atmospheric pressure. As such, without boosted conditions, there may be a significantly reduced motive flow through the aspirator. If boosted conditions are not present, routine 400 continues to 404 to determine if boost is to be initiated. For example, a request for boost may be received responsive to an operator tip-in event. If it is determined at 404, that boost conditions are to be initiated, routine 400 continues to 408 to close the SOV to provide a rapid rise in boost pressures. For example, the SOV may be adjusted to a fully closed position from a fully open position. In another example, the SOV may be fully closed from a partly open position. As such, the SOV may be maintained in an open position (fully open, partly open, etc.) to generate ejector vacuum. Alternatively, the SOV may be closed during non-boosted conditions. If the SOV is in an open position, it may negatively impact a time-to-boost and may lead to turbo lag by diverting compressed air away from the intake throttle during spool-up. Accordingly, the SOV may be fully closed when a demand for torque is initiated. In addition, at 408, the CPV may be closed and if a purging operation is active, it may be discontinued. If it is determined at 404 that boosted conditions are not desired, routine 400 may proceed to 406 to not adjust the SOV position and may end.

At 412, it may be confirmed if a desired level of boost has been attained. For example, a desired level of boost may be a desired boost pressure. Boost pressure may be measured by TIP sensor 161 in FIG. 1. If the desired level of boost has not been achieved, routine 400 returns to 408 to maintain the SOV in its closed position. However, if the desired boost pressure has been attained, routine 400 continues to 414 to open the SOV so as to generate vacuum at the aspirator. Herein, an opening of the SOV may be increased. Thus, the SOV may be adjusted to a fully open position from the fully closed position (at 408). In another example, the SOV may be adjusted to a partly open position from the fully closed position.

Returning back to 402, if it is determined that boosted conditions are present, routine 400 proceeds to 414 to maintain the SOV in its open position. As mentioned earlier, the SOV may be maintained largely in an open position (fully open, partly open, etc.) to generate vacuum at the aspirator. At 416, it may be determined if purging conditions are met. In one example, purging conditions may be considered met in response to canister hydrocarbon load being higher than a threshold load. In another example, purging conditions may be considered met if a threshold duration of vehicle (or engine) operation has elapsed since a last purging operation. In yet another example, purging conditions may be considered met if a temperature of an emission device is higher than a threshold temperature (e.g. light-off temperature). Further still, purging conditions may be considered met if a threshold distance of vehicle (or engine) operation has elapsed since a last purging operation. If purging conditions are not met, routine 400 progresses to 418 to not purge the fuel vapor canister and the routine may end.

If purging conditions are met, routine 400 continues to 420 to determine if a pressure in the canister (e.g. fuel vapor canister) is greater than a pressure in the intake manifold. As stated earlier, pressure in the canister may be substantially equivalent to atmospheric pressure as the CVV may be largely retained at an open position. Pressure in the intake manifold may be a function of a position of the intake throttle. For example, pressure in the intake manifold may be higher than atmospheric pressure during boosted conditions when the intake throttle is at a mostly open position. In another example, pressure in the intake manifold may be lower than atmospheric pressure if the intake throttle is at a mostly closed position under boosted conditions.

If it is determined at 420 that canister pressure is not greater than manifold pressure, routine 400 continues to 422. Herein, manifold pressure may be determined to be greater than canister pressure. The CPV may be opened (or activated to pulse between an open and a closed position) at 422. At the same time, as mentioned earlier in reference to routines 200 and 300, the FTIV, if present, may be closed. Next at 424, purged fuel vapors from the canister may flow only through the aspirator. Vacuum generated at the aspirator due to motive flow of compressed air during boosted conditions may draw stored vapors from the canister via the valve in the CPV through the suction port of the aspirator and into the inlet of the compressor and thereon into the intake manifold. Next, at 426, it may be determined if a tip-in event has occurred. For example, it may be determined if the torque demand has increased by more than a threshold amount, and/or whether an accelerator pedal has been depressed by more than a threshold amount.

If the tip-in event is confirmed, routine 400 continues to 428 to close the SOV and the CPV in response to the tip-in. As such, purge flow through the aspirator may be discontinued. By closing the SOV responsive to the tip-in, boost pressure may be increased quickly. As such, this reduces turbo lag and allows the increased torque demand to be quickly met. By closing the CPV in response to the tip-in, a desired air-fuel ratio may be achieved for the increased torque demand and fueling errors may be reduced.

If at 426 a tip-in event is not confirmed, routine 400 proceeds to 430 to continue the purging operation via the aspirator. Further, routine 400 may end.

Returning to 420, if it is confirmed that canister pressure is greater than manifold pressure (manifold pressure is lower than canister or atmospheric pressure), routine 400 progresses to 432 to open the CPV. At 434, purged fuel vapors may flow into the intake manifold through both the sonic choke and the aspirator. Thus, simultaneous purge flow may occur through the sonic choke in the CPV to the intake manifold and through the aspirator into the compressor inlet (as described in routine 300 of FIG. 3).

Next, at 436, routine 400 may determine if a first pressure difference between the outlet of the solenoid valve in the CPV (which may be canister pressure) and manifold pressure is greater than a second pressure difference between the outlet of the solenoid valve in the CPV and the aspirator. It will be noted that the pressure difference herein is specifically a difference between a higher canister pressure and a lower pressure in either the intake manifold or at the suction port of the aspirator. In one example, the difference between canister pressure and the manifold pressure during an initial phase of boosted conditions may be greater than the difference between canister pressure and a pressure at the aspirator suction port. In another example, during moderate acceleration when boosted conditions are fully present, the difference between canister pressure and the pressure at the aspirator suction port may be considerable relative to the pressure difference between the canister (or solenoid valve outlet) and the intake manifold. Herein, the manifold pressure may be greater than atmospheric pressure.

If the pressure difference between the solenoid valve outlet and the intake manifold is greater than the pressure difference between the solenoid valve outlet and the aspirator, routine 400 progresses to 438 to close the SOV. Further, at 440, desorbed fuel vapors from the canister may be purged only through the sonic choke. Routine 400 then returns to 436 to perform the pressure difference check.

If, on the other hand, the pressure difference between the solenoid valve outlet and the intake manifold is determined to be smaller than the pressure difference between the solenoid valve outlet and the aspirator, routine 400 continues to 442. Herein, the SOV may be either retained at or moved to an open position to enable simultaneous purge flow through the sonic choke and the aspirator. As such, purged fuel vapors may substantially flow through the aspirator with a smaller portion flowing through the sonic choke. Routine 400 then ends.

In this manner, the SOV may be used to enable purge flow through the aspirator when a larger pressure difference is present between the canister and the aspirator. Further, the position of the SOV and the CPV may be adjusted in response to transient engine conditions such as tip-in events resulting in a sudden increase in torque demand. By closing the SOV in response to a tip-in event during boosted conditions, a rapid rise in boost pressure may be enabled. At the same time, aspirator vacuum may not be generated.

Turning now to FIG. 5, it shows map 500 illustrating an example purging operation in an example engine system, such as that of FIG. 1, during boosted and non-boosted conditions in accordance with the present disclosure. Map 500 includes an indication of purge flow through the sonic choke in the CPV at plot 502, an indication of purge flow through the aspirator at plot 504, a position of a SOV at plot 506, CPV operation at plot 508, position of the FTIV (when present) at plot 510 (small dashes), canister load at plot 512, intake manifold pressure (MAP) at plot 514, a position of a wastegate at plot 516, boost pressure at plot 518, and engine speed at plot 520. All the above are plotted against time on the x-axis and time increases from the left to the right along the x-axis. Further, line 513 represents a threshold canister load and line 515 represents atmospheric pressure. As mentioned earlier, canister pressure may be substantially equivalent to atmospheric pressure. Therefore, line 515 may also represent canister pressure.

Between t0 and t1, the engine may be at idle wherein non-boosted conditions may be present. Therefore, the wastegate is at a fully open position and boost pressure is nominal. Since canister load is greater than threshold canister load (line 513), and the engine is operating with a vacuum condition (manifold pressure is significantly lower than atmospheric as shown in plot 514) in the intake manifold, a purge flow may be initiated by opening the CPV (plot 508). As such, opening of the CPV indicates an activation of the solenoid valve such that it pulses between an open and a closed position at a higher frequency. Since the engine is not boosted, the SOV may be adjusted to a fully closed position (plot 506) and there may be no purge flow through the aspirator. Further, during the purge operation between t0 and t1, the FTIV may be at a closed position. Though not shown in FIG. 5, a CVV may also be maintained open to enable purge flow through the fuel system canister. Between t0 and t1, therefore, substantial purge flow may occur through the sonic choke into the intake manifold (plot 502).

At t1, an operator may depress an accelerator in a tip-in event and engine speed may increase significantly. To expedite turbocharger spool-up, the wastegate may be moved to a fully closed position. As such, since the SOV is at its closed position, boost pressure at the intake throttle may also rise rapidly (plot 518). At the same time, purge flow through the sonic choke in the CPV may be discontinued by closing the CPV. Accordingly, between t1 and t2, purge flow may not occur either via the sonic choke or via the aspirator. Between t1 and t2, engine speed may also rise sharply during the tip-in.

At t2, the tip-in event may end and engine speed may decrease gradually. At the same time, between t2 and t3, boost pressure may slowly decrease as the wastegate is gradually moved to a more open position at t2. The engine may be operating in boosted conditions and manifold pressure may be considerably higher than atmospheric (plot 514 and line 513).

An opportunistic purge operation may be enabled between t2 and t3 to reduce stored vapors further below the canister load threshold (line 513). Since the engine is boosted and operating at steady-state conditions, the SOV may be opened to a fully open position at t2 to generate vacuum at the aspirator. The CPV may be activated open and the FTIV may be maintained closed to enable a more efficient purge. Vacuum generated by the aspirator may now be applied to the tap between the outlet of the solenoid valve and the inlet of the sonic choke in the CPV. Accordingly, purge vapors may stream from the solenoid valve into the aspirator via a purge line (e.g. second purge line 184 in FIG. 1). Thus, after t2, purge flow of fuel vapors may occur primarily through the aspirator into the compressor inlet. Further, there may be no purge flow through the sonic choke since manifold pressure is higher than canister (or atmospheric) pressure. Optionally, at t2, since canister load is below the threshold canister load, an opportunistic purge operation may not be initiated as shown by dashed segment 511. Accordingly, canister load may not change between t2 and t4.

At t3, an engine idling condition may occur. Accordingly, the SOV may be closed. The CPV may also be closed at t3 as canister load is reduced substantially. Further, at t3, the wastegate may be at a fully open position with nominal boost pressure.

At t4, the engine may be shut down and may be at rest. As such, the engine may be turned "off" in a key-off condition. Further, a refueling event may occur between t4 and t5. Thus, in the depicted example, the engine may be shut down and at rest during a vehicle refueling between t4 and t5. Further, between t4 and t5, the CPV may be closed and the FTIV may be opened to allow fuel vapors to flow into the fuel system canister for adsorption and storage. Further, the CVV may be opened (not shown in map 500) to allow air to exit into the atmosphere once it is stripped of fuel vapors. Accordingly, canister load increases between t4 and t5 as the amount of stored fuel vapors in the canister rises during the refueling event.

At t5, engine start may occur subsequent to the refueling event. Engine start may be followed by a gradual rise in engine speed as the vehicle starts moving. The wastegate may be partly closed to enable an increase in boost pressure. As shown, the rise in engine speed and boost pressure may be relatively gradual compared to a tip-in event. Therefore, the SOV may be opened at t5. Since the engine is now boosted, the SOV may be opened to allow vacuum generation at the aspirator. Further, at t5, the CPV may be opened and the FTIV may be closed to enable purge flow since canister load is greater than the threshold (line 513). The vacuum generated at the aspirator may draw fuel vapors from the canister into the compressor inlet. Further still, since canister pressure is higher than manifold pressure at t5, purge flow may simultaneously occur through the sonic choke directly into the intake manifold. Therefore, between t5 and t6, purged vapors from the canister may flow through both the sonic choke and the aspirator. In response to the concurrent purge flow, canister load reduces relatively rapidly until t6. At t6, an operator pedal tip-in may occur. In response to this tip-in event, the SOV as well as the CPV may be closed and purging may be discontinued. Further, the wastegate may be adjusted to the fully closed position to enable a rapid increase in speed of the exhaust turbine of the turbocharger. Furthermore, the manifold pressure may rise above atmospheric.

At t7, the tip-in event may end and boost pressure as well as engine speed may achieve steady state levels. Further, the wastegate may be adjusted to a more open position. An opportunistic purge operation may be initiated to reduce canister load further by opening the SOV and the CPV at t7. Since manifold pressure is greater than canister (or atmospheric) pressure, purge flow may not occur via the sonic choke. Between t7 and t8, therefore, purge flow occurs primarily via the aspirator into the compressor inlet. Herein, the engine may continue to be boosted with the wastegate at a partly open position and boost pressure at moderate levels. At t8, engine speed may return to idle as the vehicle may be stopped. Further, boost pressure may reduce considerably as the wastegate is adjusted to a fully open position. Since the engine is now in a non-boosted condition, the SOV may be closed at t8 and purge flow through the aspirator may end. Since the canister load is significantly below threshold (line 513), the CPV may be closed and there may be no purge flow through the sonic choke after t8. It will be noted that in another example, canister purging may not occur after t7 as shown by dashed segment 515. As such, opportunistic purging may not be initiated at t7.

Thus, an example method for a boosted engine may include during boosted conditions, opening a shut-off valve (SOV) positioned in a compressor bypass passage to generate vacuum at an ejector, operating a solenoid valve in a canister purge valve (CPV), and purging fuel vapors from a canister via the solenoid valve in the CPV to the ejector, the purging bypassing a sonic nozzle in the CPV, and during a tip-in event, closing each of the SOV and the solenoid valve in the CPV to discontinue purging. Herein, purging fuel vapors from the canister during boosted conditions may comprise flowing fuel vapors from the canister through the solenoid valve in the CPV, past a check valve upstream of the ejector, and via the ejector into an inlet of a compressor. Further, the fuel vapors may flow into the inlet of the compressor positioned upstream of an intake throttle, past the intake throttle, and thereon into an intake manifold. The method may further comprise, during boosted conditions and when intake manifold pressure is lower than a pressure in the canister, purging additional fuel vapors from the canister through the sonic nozzle into the intake manifold. The purging of additional fuel vapors through the sonic nozzle may include flowing additional fuel vapors from the canister through the solenoid valve in the CPV into the sonic nozzle in the CPV, and then on into the intake manifold downstream of the intake throttle. The method may also comprise, during non-boosted conditions, not generating vacuum at the ejector such that purged fuel vapors from the canister do not flow via the ejector, and only flowing fuel vapors from the canister through each of the solenoid valve and the sonic nozzle in the CPV. It will be noted that the solenoid valve and the sonic nozzle may be positioned together within a single, common housing in the CPV, and wherein the sonic nozzle may be located proximate to the solenoid valve.

Turning now to FIG. 7, it shows an alternative embodiment to the engine system of FIG. 1. Engine system 110 of FIG. 7 is substantially similar to engine system 100 of FIG. 1 but differs in the coupling between suction port 194 of aspirator 180 to the fuel vapor canister 122 and in that CPV 163 of FIG. 7 comprises two ports unlike CPV 164 of FIG. 1 which includes three ports. The description of FIG. 7 below will only introduce new components. As such, components previously introduced in FIG. 1 are numbered similarly in FIG. 7 and are not reintroduced.

Engine system 110 includes a two-port CPV 163 comprising a first, inlet port 167 in fluidic communication with fuel vapor canister 122 and a second, outlet port 169 fluidically coupling an outlet of sonic choke 175 to intake manifold 144 via purge path 159. To elaborate, first inlet port 167 of CPV 163 is fluidically coupled to fuel vapor canister 122 via first conduit 158 and purge conduit 125. In alternative embodiments, an optional check valve 153 may be included in purge path 159 between the outlet of sonic choke 175 and intake manifold 144.

CPV 163, similar to CPV 164, also comprises a solenoid valve 173 and the sonic choke 175 enclosed within a single, common housing. Sonic choke 175 is positioned proximate to solenoid valve 173 within CPV 163. It may be further noted that the CPV 163 may include valves other than solenoid valves and flow restrictions other than sonic chokes without departing from the scope of the present disclosure. In some examples, a flow restriction may not be included in the common housing of the CPV without departing from the scope of this disclosure. Sonic choke 175 may also be termed sonic nozzle 175. As depicted in FIG. 7, flow restriction 175 (or sonic choke 175) is positioned downstream of solenoid valve 173 such that an inlet of sonic choke 175 fluidically communicates with an outlet of solenoid valve 173.

Aspirator 180 is fluidically coupled to fuel vapor canister 122 via third conduit 156 and purge conduit 125. Check valve 154 is positioned in third conduit 156 enabling a flow of fluid only from fuel vapor canister 122 towards suction port 194 of aspirator 180. Further, check valve 154 may impede fluid flow from aspirator 180 towards fuel vapor canister 122. As in engine system 100, motive flow through ejector 180 may be controlled by shut-off valve 185. Accordingly, vacuum generation at aspirator 180 may be regulated by shut-off valve 185. Further, by controlling vacuum generation at aspirator 180, shut-off valve 185 may also regulate purge flow from canister 122. As in engine system 100, shut-off valve (SOV) 185 may be a binary on/off valve or a continuously variable valve. It will be noted that the SOV 185 is positioned upstream of ejector 180 and no other component is positioned between ejector 180 and SOV 185. While the embodiment depicted in FIG. 7 positions SOV 185 in second passage 191 of the compressor bypass passage upstream (relative to motive flow) of ejector 180, other embodiments may include SOV 185 in the first passage 186 of the compressor bypass passage. Herein, SOV 185 may be positioned downstream (relative to motive flow through the compressor bypass passage) of ejector 185. Alternatively, SOV 185 may be located in purge conduit 125 downstream of canister 122. In another example, SOV 185 may be positioned in third conduit 156.

The SOV 185 may be closed (or adjusted to a fully closed position) to stop purge flow through the ejector. Specifically, adjusting SOV 185 to a fully closed position disables (e.g. stops) motive flow through aspirator 180, discontinuing vacuum generation, and therefore, ceasing purge flow from canister 122 into the passage upstream of the compressor and into the compressor inlet. Cessation of purge flow in this manner may be useful for diagnostics and learning of the proportion of air and fuel vapor being drawn from the canister.

As depicted in FIG. 7, fuel vapor canister 122 fluidically communicates with each of aspirator 180 and CPV 163 via separate and distinct passages e.g. first conduit 158 and third conduit 156. It will be noted that example engine system 110 of FIG. 7 does not include a fluidic coupling between suction port 194 of ejector 180 and CPV 163. Instead, fuel vapor canister 122 in engine system 110 of FIG. 7 is fluidically coupled to suction port 194 of ejector 180 via third conduit 156. As such, third conduit 156 circumvents CPV 164.

In contrast to the embodiment depicted in FIG. 1, purge flow from fuel vapor canister 122 to the entraining inlet 194 of aspirator 180 may not be restricted by solenoid valve 172 of CPV 163. Put another way, fuel vapors flowing from canister 122, through purge conduit 125, past check valve 154, along third conduit 156 into suction port 194 of aspirator 180 may not be impeded by a solenoid valve (such as solenoid valve 173) or by a sonic choke (such as sonic choke 175) in a canister purge valve. Thus, purge flow entering entraining inlet 194 of ejector 180 may not be regulated in any way.

As shown in FIG. 7, third conduit 156 is coupled to purge conduit 125 at junction 155 positioned upstream of CPV 163 and downstream of fuel vapor canister 122. Specifically, third conduit 156 is fluidically coupled with purge conduit 125 upstream of inlet port 167 of CPV 163. Accordingly, stored fuel vapors from fuel vapor canister 122 may be drawn towards aspirator 180 when a vacuum is generated at the aspirator 180, e.g. during boost conditions. In other words, the fuel vapor canister may be purged whenever there is motive flow through the ejector 180.

Furthermore, without a flow restriction such as sonic choke 175 of CPV 163 in the third conduit, purge flow along third conduit 156 may continue as long as vacuum is generated at ejector 180, stored vapors are present in the canister, and as long as the pressure at the aspirator neck is lower than canister pressure (or atmospheric pressure). Controller 112 may not actively control purge flow via third conduit 156. As such, purge flow control along third conduit 156 may not be required because at boosted conditions when aspirator vacuum may be generated due to motive flow, engine 102 can tolerate higher fuel vapor flow rates. However, purge flow in third conduit 156 may be regulated by controlling SOV 185. For example, during transient engine conditions such as those with an abrupt increase in torque demand SOV 185 may be closed to enable rapid increase in boost pressure and reduce fueling errors due to purge flow. Control of SOV 185 and CPV 163 in response to engine conditions will be further elaborated in reference to FIG. 10.

Controller 112 of engine system 110 may be similar to that in engine system 100. Storage medium read-only memory in controller 112 can be programmed with computer readable data representing instructions executable by a processor for performing the routines described below, as well as other variants that are anticipated but not specifically listed. Example routines are described herein with reference to FIGS. 8, 9 and 10.

Thus, an example system for an engine may include an intake manifold, an intake throttle, a boost device including a compressor, the compressor positioned in an intake passage upstream of the intake throttle, a canister purge valve comprising a solenoid valve and a sonic choke, the sonic choke coupled immediately downstream of the solenoid valve, an inlet of the sonic choke fluidically coupled to an outlet of the solenoid valve, an outlet of the sonic choke fluidically coupled to the intake manifold, the outlet of the sonic choke coupled to the intake manifold downstream of the intake throttle, an ejector coupled in a compressor bypass passage, the compressor bypass passage including a shut-off valve, a fuel vapor canister fluidically communicating with each of an inlet of the canister purge valve and a suction port of the ejector via distinct passages, a motive inlet of the ejector coupled to the intake passage downstream of the compressor, and a motive outlet of the ejector coupled to the intake passage upstream of the compressor.

FIG. 8 presents an example routine 800 illustrating canister purging based on whether boosted conditions are present or absent in an engine system, such as engine system 110 of FIG. 7. Specifically, during non-boosted conditions, the canister purge valve may regulate the flow of purged fuel vapors into the intake manifold. During boosted conditions, desorbed fuel vapors from the fuel vapor canister may flow into the aspirator as long as a motive flow through the aspirator generates a vacuum. As such, purge flow through the aspirator may be regulated by the shut-off valve (SOV 185) in the compressor bypass passage.

At 802, engine operating parameters such as torque demand, engine speed, barometric pressure (BP), MAP, air-fuel ratio, catalyst temperature, etc. may be estimated and/or measured. For example, torque demand may be estimated based on accelerator pedal position. Further, air-fuel ratio may be measured by an output of an exhaust sensor coupled to the exhaust manifold in the engine.

At 804, routine 800 may determine if the engine is operating under boosted conditions. For example, a boosted condition may be confirmed when throttle inlet pressure is higher than atmospheric pressure. Throttle inlet pressure or boost pressure may be measured by TIP sensor 161 of FIG. 7. In another example, boost conditions may be confirmed if one or more of a higher engine load and a super-atmospheric intake condition is/are present.

If boosted conditions are confirmed, routine 800 proceeds to 806 to determine if canister pressure is greater than manifold pressure (MAP). As explained in reference to FIG. 2, canister pressure may be substantially equivalent to atmospheric pressure when the canister vent valve (e.g. CVV 120) is open. Further, CVV 120 may be maintained open constantly except during a canister leak test. If manifold pressure is confirmed to be lower than canister (or atmospheric) pressure, routine 800 proceeds to 808 where routine 900 of FIG. 9 may be activated. Specifically, routine 900 enables a simultaneous purge via the aspirator and the CPV when purging conditions are met. Routine 900 will be further described in reference to FIG. 9 below.

If it is determined at 806 that manifold pressure is greater than canister pressure, routine 800 progresses to 810 to adjust the positions of various valves for purge through the aspirator. At 812, the SOV may be opened or maintained open to enable motive flow through the aspirator, e.g. aspirator 180, in the compressor bypass passage. At 814, the CPV may be closed or maintained closed such that, at 816, no purge flow occurs through the CPV. The CVV may be maintained open and the FTIV may be closed at 818.

With compressed air flowing through the ejector as motive flow, vacuum may be generated in the aspirator that may be applied to the fuel vapor canister. Thus, in reference to FIG. 7, during boosted conditions, purge vapors may flow from the canister 122, through purge conduit 125 into third conduit 156, past check valve 154 into suction port 194 of the aspirator 180 coupled in the compressor bypass passage. Further, when the engine is operating under boosted conditions and manifold pressure is higher than canister pressure, the CPV may not be actuated and purge flow through the CPV may not occur.

At 820, therefore, compressed air may be streamed from downstream of the compressor 114 (and in the example of FIG. 7, downstream of intercooler 143) and upstream of intake throttle 165, through the aspirator 180, towards the compressor inlet. This motive flow of compressed air through the ejector generates a vacuum. At 822, vacuum may be drawn at the neck of the aspirator, and at 824, applied to the fuel vapor canister. Consequently, the applied vacuum may draw stored fuel vapors from the canister and at 825 these vapors may be received via the aspirator at the inlet of the compressor. Since the CPV is closed, fuel vapors bypass the CPV at 826.

Fuel vapors received at the compressor inlet may then flow into the intake manifold for combustion in the cylinders of engine 102. Based on the quantity of fuel vapors received from the canister, engine fueling may be adjusted at 852. Thus, an amount of fuel injected and/or fuel injection timing may be adjusted in response to an amount of fuel vapors received from the canister. In one example, the fuel injection amount and/or timing may be adjusted to maintain a cylinder air-fuel ratio at or close to a desired ratio, such as stoichiometry. For example, fuel injection amount may be decreased in response to an increase in fuel vapors received from the canister. In another example, fuel injection amount and/or timing may be modified to maintain engine combustion for a desired torque. In yet another example, one or both of fuel injection timing and fuel injection amount may be varied to maintain each of desired engine torque and a stoichiometric air-fuel ratio. Furthermore, a sensor may determine an air-fuel ratio of exhaust gases exiting the engine and the determined air-fuel ratio may be compared with a desired air-fuel ratio. The controller may calculate an error based on a difference between the desired air-fuel ratio and the determined air-fuel ratio. Fuel injection from fuel injectors may, accordingly, be adjusted based on the calculated error.

Returning to 804, if it is confirmed that boosted conditions do not exist, routine 800 continues to 828 to determine if purging conditions are met. Non-boosted conditions, in one example, may include an engine idling condition. Purging conditions may be met based on one or more of the following conditions: a hydrocarbon load of the canister being higher than a threshold load, a temperature of an emission device being higher than a threshold temperature, and an elapse of a threshold duration of vehicle and/or engine operation since a previous purging operation. Hydrocarbon load stored in the fuel system canister may be measured based on one or more sensors in the emission control system (e.g. sensor 138 coupled to fuel vapor canister 122 of FIG. 7) or estimated based on a learned vapor amount/concentration at the end of a previous purging cycle. The amount of fuel vapors stored in the fuel system canister may be further estimated based on engine and vehicle operating conditions including a frequency of refueling events and/or frequency and duration of previous purging cycles. If purging conditions are not confirmed and not met, routine 800 progresses to 830 to not perform the purging routine, and routine 800 ends.

If purging conditions are met at 828, routine 800 continues to 832 to adjust positions of various valves for purge flow. Accordingly, the canister vent valve (e.g. CVV 120) may be maintained open or opened (from a closed position) at 834, the FTIV (if present) may be closed (from an open position) or maintained closed at 836, and the CPV (e.g. CPV 163 of FIG. 7) may be opened at 838. The shut-off valve in the compressor bypass passage (e.g. SOV 185) may be closed at 840 during non-boosted conditions.

As such, opening of CPV 163 includes communicating a pulse width modulated signal to solenoid valve 173 which may be pulsed in an open/closed mode. Solenoid valve 173 may be a fast response valve. In one example, the solenoid valve may be pulsed at 10 Hz. The pulse width modulated signal may vary the duration of open valve time to control an average purge flow rate. Further, the opening and closing of the solenoid valve may be synchronized with engine cylinder combustion events.

With the opening of the CPV, fuel vapors may flow (mixed with air) from the fuel vapor canister through purge conduit 125, along first conduit 158, via solenoid valve 173, through sonic choke 175, past check valve 153 (if present) in purge path 159 into intake manifold 144 of engine system 110. Sonic choke 175 may enable flow metering under conditions when the intake manifold has at least 8 kPa of vacuum.

Thus, at 842, intake manifold vacuum may be utilized to draw air through the canister to allow desorption and purging of stored fuel vapors in the canister. Further, the intake vacuum may draw these desorbed and purged fuel vapors from the canister through the CPV. Flow of purged vapors through the CPV includes flowing the purged vapors through the solenoid valve, at 844, and then flowing these purged vapors through the sonic choke, at 846. As such, with the SOV adjusted to a fully closed position during non-boosted conditions and without vacuum generation at the aspirator, purge vapor flow may bypass the aspirator at 848.

At 850, purged vapors may be received from the sonic choke in the intake manifold downstream of the intake throttle (e.g. intake throttle 165). Further, these purged vapors may be delivered into combustion chambers for combustion. Based on an amount of fuel vapors received in the manifold from the canister, engine fueling by fuel injectors may be adjusted. Accordingly, at 852, fuel injection timing and/or fuel injection amount may be modified based on the quantity of purged fuel vapors received from the canister in the intake manifold. For example, fueling via fuel injectors may be decreased as purged fuel vapor concentration increases so as to maintain combustion at stoichiometry. Routine 800 may then end.

Turning now to FIG. 9, it shows routine 900 illustrating an example purging during boosted conditions when canister pressure is higher than manifold pressure (MAP). Specifically, a purge operation may include flowing desorbed fuel vapors from the canister via the aspirator and flowing additional vapors via the CPV into the intake manifold.

At 902, routine 900 may determine if canister pressure is greater than manifold pressure in the engine intake manifold. In other words, it may be determined if manifold pressure is lower than canister pressure. In one example, manifold pressure may be lower than atmospheric (or canister) pressure during boosted conditions when the intake throttle is adjusted to a mostly closed position. As described earlier in reference to 806 in routine 800, canister pressure may be substantially equivalent to atmospheric pressure since the CVV is mostly maintained open. If canister pressure is determined to be lower than manifold pressure, routine 900 proceeds to 904 where it may not continue the purging method and ends. Herein, purging may occur only via the aspirator vacuum as described earlier in reference to routine 800.

If canister pressure is confirmed to be greater than manifold pressure, routine 900 continues to 906 to confirm that purging conditions are met. As explained in reference to 828 of routine 800, purging conditions may include one or more of a load of the canister being higher than a threshold load, a temperature of an emission device being higher than a threshold temperature, and an elapse of a threshold duration of vehicle and/or engine operation since a previous purging operation. If purging conditions are not satisfied, routine 900 continues to 908 to not activate the CPV and at 910, routine 900 may return to 810 of routine 800 to continue purge flow only via the aspirator. Optionally, the controller may choose to continue with purging via the CPV even if purging conditions are not met to opportunistically reduce canister load.

If purging conditions are met at 906, routine 900 proceeds to 912 to adjust the positions of different valves for simultaneous purge flow via the CPV and the aspirator. At 914, the CVV (e.g. CVV 120) may be maintained open to draw fresh air from the atmosphere into the canister. Next, at 916, the FTIV (if present) may be closed from an open position or may be maintained closed. Further, at 918, the CPV may be opened. As explained earlier, the CPV may be pulsed open and closed at a given frequency. An example frequency may be 10 Hz. Further still, at 920, the shut-off valve (SOV) in the compressor bypass passage may be maintained open (or opened if closed). In one example, the SOV may be adjusted to an "on" position wherein the valve may be at a fully open position. Herein, the SOV may be adjusted to a fully open position from a fully closed position. In another example, the controller may select a degree of opening of the SOV based on a desired vacuum level at the aspirator. Thus, the SOV may be opened from a closed position. As such, the SOV may be moved to a more open position from a more closed position. In another example, the SOV may be adjusted to a fully open position from a mostly closed position.

Once the valves are adjusted to their positions, desorbed fuel vapors from the canister may concurrently flow through the CPV and via the aspirator. Accordingly, a first portion of fuel vapors from the fuel vapor canister may flow through the aspirator as follows: at 922, compressed air from downstream of the compressor and upstream of the intake throttle may be directed through the aspirator to the compressor inlet. This motive flow of compressed air through the aspirator enables a vacuum to be drawn at the neck of the aspirator, at 924, which may then be directly applied to the fuel vapor canister. At 926, this applied vacuum may draw the first portion of purged fuel vapors from the canister to the compressor inlet via the aspirator. Further, at 936, based on the amount of vapors received in the intake manifold, fuel injection amount and/or timing may be adjusted to maintain engine combustion at a desired air-fuel ratio, such as stoichiometry.

At the same time, a second portion of fuel vapors (or additional vapors) may flow through the solenoid valve and the sonic choke in the CPV as follows: at 928, manifold pressure, being lower than canister pressure, may draw purged vapors from the canister through the CPV. As 930, the vapors may stream first through the solenoid valve in the CPV, and then at 932, flow through the sonic choke positioned downstream of the solenoid valve.

Vapors may be received at 934 from the sonic choke directly into the intake manifold downstream of the intake throttle. Further, at 936, engine fueling may be adjusted by modifying the fuel injection amount and/or timing to maintain stoichiometric combustion.

Thus, during boosted conditions when manifold pressure is lower than canister pressure, purge flow may occur from the fuel vapor canister 122 via purge conduit 125 through two paths: first conduit 158 and third conduit 156. Desorbed fuel vapors from the canister may flow through each of purge conduit 125, first conduit 158, through CPV 163 and purge path 159 into intake manifold 144 and through purge conduit 125, third conduit 156, past check valve 154, and into suction port 194 of aspirator 180. Vapors received at entraining inlet 194 of aspirator 180 may then flow via first passage 186 and enter the compressor inlet at first end 145 of compressor bypass passage located upstream of compressor 114.

Turning now to FIG. 10, it demonstrates routine 1000 for adjusting states of the SOV and the CPV based on engine conditions. Specifically, the routine may determine an initial position for the two valves and then based on engine operating conditions, including based on engine transients, etc., the positions of the two valves may be further modified.

At 1002, routine 1000 includes estimating and/or measuring engine operating conditions. These may include, for example, engine speed, torque demand, catalyst temperature, engine temperature, exhaust air-fuel ratio, MAP, MAF, barometric pressure, etc. At 1004, based on the estimated engine operating conditions, an initial valve position may be determined for each of the SOV and the CPV. For example, at steady state boosted conditions, the SOV may be adjusted to a fully open or mostly open position. In another example, if purging conditions such as those described earlier in reference to routines 800 and 900 are not met, the CPV may be maintained closed or inoperative.

At 1006, it may be determined if engine cold start conditions are present. A cold engine start may include cranking the engine from rest via a motor, such as a starter motor, when the engine temperature is lower than an operating temperature. Further, during an engine cold start, an emission treatment device in the exhaust may not have attained light-off temperature. Furthermore, a turbocharger spool-up in a turbocharged system in preparation for tip-in may be anticipated at the engine start. If engine cold start conditions are present, to enable a rapid rise in boost pressure, the SOV may be temporarily closed at 1008, at least during an early part of an engine start. Further still, the CPV may be closed or maintained closed at 1008 to disable purge operation from the fuel system canister to reduce fueling errors.

Routine 1000 then proceeds to 1010 where it may be determined if there is a sudden increase in torque demand (e.g., due to a tip-in). If yes, then at 1012, routine 1000 includes adjusting the SOV to a closed position. By closing the SOV, compressed air discharged from the compressor outlet may not be diverted into the compressor bypass passage providing a rise in boost pressure and enhanced engine power. Further, the CPV may be closed or maintained closed. If a purging operation was active prior to the tip-in, the purging may be discontinued by closing the CPV.

Next, routine 1000 continues to 1014 to determine if there is a sudden decrease in torque demand (e.g. due to a tip-out). If yes, at 1016, the SOV may be opened or maintained open to reduce compressor surge conditions. Further, the CPV may be closed or maintained closed to reduce the flow of fuel vapors into the engine intake during the reduction in torque demand.

At 1018, routine 1000 may confirm if the engine is in an idling condition. Engine idling may be an example of a non-boosted condition wherein the compressor may not be providing boosted air into the intake. Further, during idle, the intake throttle may be mostly closed or fully closed resulting in higher levels of manifold vacuum. Accordingly, if an idling condition is confirmed, routine 1000 proceeds to 1020 where the CPV may be opened to take advantage of the manifold vacuum in drawing stored fuel vapors from the fuel vapor canister. However, the CPV may be opened based on purging conditions being met. Further, the SOV may be closed during idling conditions. Optionally, the SOV may be maintained open but the vacuum generated at the aspirator may be weaker than manifold vacuum resulting in a higher flow of purged vapors through the CPV relative to purge flow via the aspirator. Accordingly, the SOV may be closed during engine idle and purge flow may largely occur via the CPV.

Routine 1000 then progresses to 1022 to determine if boosted conditions are present wherein the manifold pressure is higher than canister pressure. If yes, at 1024, the SOV may be opened or maintained open and the CPV may be closed. As described earlier in reference to routine 800, with manifold pressure being higher than canister pressure, purge flow may occur only via the aspirator and may bypass the CPV. If not, routine 1000 continues to 1026 to confirm if boosted conditions are present wherein the manifold pressure is lower than canister pressure. If yes, at 1028, the SOV may be opened or maintained open and the CPV may be activated to open. As such, the opening of the CPV may be based on purging conditions being met. Thus, with the SOV and the CPV being opened simultaneously, purge flow may occur through two different paths: via the aspirator and via the CPV.

It will be noted that the adjusting of the SOV may be temporary until the transient engine conditions exist. For example, at the end of a tip-in event if a desired boost level has been attained, the SOV may be opened.

An example method for a boosted engine may, thus, comprise during boosted conditions, closing a canister purge valve (CPV), adjusting an opening of a shut-off valve (SOV) positioned upstream of an ejector in a compressor bypass passage, and flowing fuel vapors from a canister only to the ejector, the flowing regulated by the SOV and bypassing the CPV, and during non-boosted conditions, closing the SOV, opening the CPV, and flowing fuel vapors from the canister only to the CPV, the flowing bypassing the ejector. During non-boosted conditions, the CPV may be opened based on one or more purging conditions being met, the purging conditions including one or more of a hydrocarbon load of the canister being higher than a threshold load, a temperature of an emission device being higher than a threshold temperature, and an elapse of a duration longer than a threshold duration subsequent to a previous purging operation. The method may further comprise closing each of the SOV and the CPV in response to an operator pedal tip-in. The method may also comprise closing each of the SOV and the CPV in response to an engine cold start.

Turning now to FIG. 11, it includes map 1100 depicting an example purging operation in the example engine system 110 of FIG. 7 based on different engine conditions in accordance with the present disclosure. Map 1100 includes an indication of purge flow through the CPV at plot 1102, an indication of purge flow through the aspirator at plot 1104, a position of a SOV at plot 1106, CPV operation at plot 1108, canister load at plot 1112, intake manifold pressure (MAP) at plot 1116, boost pressure at plot 1118, engine speed at plot 1120, and pedal position at plot 1122. All the above are plotted against time on the x-axis and time increases from the left to the right along the x-axis. Further, line 1111 represents a threshold canister load and line 1117 represents atmospheric pressure. As mentioned earlier, canister pressure may be substantially equivalent to atmospheric pressure. Therefore, line 1117 may also represent canister pressure.

Between t0 and t1, the accelerator pedal may be released, and the engine may be at idle with non-boosted conditions. As such, between t0 and t1, an engine cold start may be occurring. Since engine temperature may be lower than desired during a cold start and the emission device may not be at light-off temperature, each of the SOV and the CPV may be closed even though manifold pressure is lower than atmospheric pressure (line 1117). At t1, a tip-in event may occur as the pedal is fully depressed resulting in a sudden rise in torque demand. In response to the tip-in event, the SOV may be maintained closed to enable a build-up of boost pressure. Accordingly, boost pressure may rise significantly at t1 with a corresponding increase in engine speed. The CPV may be maintained closed during the tip-in event and canister purging may not occur between t1 and t2.

At t2, the pedal may be released partly and a steady state driving condition may ensue. Boost pressure and engine speed may reduce gradually to moderate levels after t2. In response to the steady state conditions and completion of the tip-in event, the SOV may be opened to allow compressed air to flow through the compressor bypass passage and the aspirator. Vacuum generated at the aspirator due to compressed air motive flow may draw stored fuel vapors from the fuel vapor canister resulting in a corresponding decrease in canister load between t2 and t3. Since the manifold pressure is higher than canister pressure between t2 and t3, the CPV may be maintained closed and purge flow may not occur via the CPV.

At t3, an engine transient may occur in the form of a tip-out as the pedal is released completely. The sudden decrease in torque demand may reduce engine speed and boost pressure. The SOV may be maintained open to reduce compressor surge conditions during the tip-out. As such, stored fuel vapors may continue to be drawn from the canister between t3 and t4 with a corresponding reduction in canister load. Alternatively, the opening of the SOV may be adjusted to reduce compressor surge while decreasing purge flow.

At t4, a key-off event may occur in anticipation of a refueling event. Herein, the engine is shut down and at rest as the vehicle is refueled. In response to the refueling event at t4, the FTIV may be opened (not shown) while the CPV and the SOV are closed. During refueling (between t4 and t5), the fuel system canister load rises steadily as refueling vapors are captured in the canister. Thus, by t5, when the engine is activated and operational (e.g., a vehicle key-on event), the fuel system canister load may be higher. In particular, the fuel system canister load may be higher than threshold load (line 1111). Between t5 and t6, the engine may be idling and a purging operation may be initiated by opening the CPV. As such, purging conditions such as canister load, and emission device being at a higher temperature may be met at t5. Manifold vacuum may be applied to the fuel system canister to draw stored vapors into the intake manifold. Since this is a non-boosted condition, the SOV may be closed between t5 and t6, and purged vapors may only flow via the CPV and not via the ejector.

Next, at t6, the pedal may be depressed gradually as the vehicle is set in motion. Each of boost pressure and engine speed may rise slowly in response to the increase in torque demand. The SOV may also be opened at t6 since the engine is now boosted. Canister load may decrease between t6 and t7 due to concurrent purge operations via the aspirator and the CPV. The CPV may be maintained open after t6 as the manifold pressure continues to remain below canister pressure during boosted conditions.

At t7, though, both the SOV and the CPV may be temporarily closed in response to a pedal tip-in event. Each of boost pressure and engine speed rise rapidly between t7 and t8. In addition to closing the SOV, a wastegate may also be adjusted to a fully closed position to enable turbocharger spool up and an increase in boost pressure. At t8, the tip-in event may end as the pedal is released gradually and steady state driving conditions may be resumed. Accordingly, the SOV may be opened to enable compressor bypass flow allowing further reduction in canister load as additional fuel vapors are purged via the aspirator. At t8, the CPV may be maintained closed as the manifold pressure is higher than canister pressure. Therefore, purge flow may only occur via the aspirator and may bypass the CPV between t8 and t9.

At t9, the pedal may be released again to return the engine to an idling condition. In response to the idling, the SOV may be closed and purge through the aspirator may be discontinued. In an alternative example, the SOV may be maintained open to further purge the canister. As such, by t9, canister load has decreased substantially and consequently, the CPV may be retained in its closed position at t9. In another alternative example, the CPV may be opened to avail of manifold vacuum in purging the canister further.

Thus, an example method for a boosted engine may comprise during boosted conditions, flowing stored fuel vapors from a canister into an ejector, the flowing bypassing a canister purge valve and being regulated by a shut-off valve (SOV) positioned upstream of the ejector, and responsive to an operator tip-in event, closing the SOV, and discontinuing the flowing of stored fuel vapors from the canister into the ejector. During boosted conditions, stored fuel vapors may flow from the canister to the ejector when the SOV is open and a motive flow exists through the ejector. The method may further comprise, during non-boosted conditions, closing the SOV, opening the canister purge valve, and flowing stored fuel vapors from the canister via the canister purge valve into an engine intake, the flowing bypassing the ejector. Herein, during non-boosted conditions, stored fuel vapors may flow from the canister via a valve and a sonic choke within the canister purge valve, the sonic choke positioned proximate to the valve in the canister purge valve. In one example, the SOV may be a continuously variable valve. During boosted conditions the flowing of stored fuel vapors may bypass the canister purge valve when manifold pressure is higher than a pressure in the canister. However, during boosted conditions, the method may also comprise, opening the canister purge valve and flowing additional stored fuel vapors via the canister purge valve when manifold pressure is lower than the pressure in the canister. The additional stored fuel vapors may flow from the canister via the canister purge valve only when purging conditions are met. Purging conditions may include one or more of a hydrocarbon load of the canister being higher than a threshold load, a temperature of an emission device being higher than a threshold temperature, and an elapse of a threshold duration of vehicle and/or engine operation since a previous purging operation. The method may further comprise not flowing stored fuel vapors via the canister purge valve responsive to the operator tip-in event.

In this way, a canister in a boosted engine may be purged during boosted and non-boosted conditions. By providing a plurality of purge paths, a frequency of canister purge may be increased. Further, by ensuring that purge flow through the aspirator is not restricted by a sonic choke, sufficient purge flow may be enabled during boosted conditions when purge flow through the sonic choke may be limited due to increased manifold pressure. By increasing the flow rate of purge through the aspirator, the canister may be cleansed more satisfactorily. Furthermore, bleed emissions from a saturated canister may be reduced and emissions compliance may be enhanced. Further still, by adjusting the positions of the shut-off valve in the compressor bypass passage to control purge and compressor bypass flow in response to transient engine conditions, engine performance may be improved.

In one representation, a method for a boosted engine may comprise fluidically coupling an ejector positioned in a compressor bypass passage to a canister, the coupling not including a canister purge valve, generating vacuum at the ejector via motive flow regulated by a shut-off valve in the compressor bypass passage, and during boosted conditions, flowing stored fuel vapors from the canister into the ejector, and during an operator tip-in event, disabling motive flow through the ejector, and discontinuing the flowing of stored fuel vapors from the canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
    during boosted conditions,
        adjusting an opening of a shut-off valve to regulate compressor bypass flow through an aspirator;
        drawing vacuum at the aspirator; and
        applying the vacuum downstream of a valve and upstream of a sonic choke, the valve and the sonic choke positioned within a common housing in a canister purge valve.

2. The method of claim 1, further comprising closing the shut-off valve in response to a tip-in event and not generating vacuum at the aspirator.

3. The method of claim 1, further comprising drawing fuel vapors from a canister through the valve in the canister purge valve via the aspirator to a compressor inlet upstream of an intake throttle.

4. The method of claim 3, wherein intake manifold pressure is higher than a pressure in the canister.

5. The method of claim 4, wherein fuel vapors from the canister do not flow through the sonic choke into an intake manifold.

6. The method of claim 3, further comprising drawing additional fuel vapors from the canister into an intake manifold via the valve and the sonic choke in the canister purge valve only when intake manifold pressure is lower than a pressure in the canister.

7. The method of claim 1, further comprising, during non-boosted conditions, applying vacuum from an intake manifold downstream of each of the valve and the sonic choke in the canister purge valve.

8. The method of claim 7, wherein fuel vapors from a canister are drawn through each of the valve and the sonic choke in the canister purge valve into the intake manifold downstream of the intake throttle.

9. The method of claim 8, wherein vacuum is not generated at the aspirator and fuel vapors from the canister are not drawn to an inlet of a compressor via the aspirator.

10. The method of claim 9, wherein the shut-off valve is adjusted to a closed position during non-boosted conditions.

11. A method for a boosted engine, comprising:
    during boosted conditions,
        opening a shut-off valve (SOV) positioned in a compressor bypass passage to generate vacuum at an ejector;
        operating a solenoid valve in a canister purge valve (CPV); and
        purging fuel vapors from a canister via the solenoid valve in the CPV to the ejector, the purging bypassing a sonic nozzle in the CPV; and
    during a tip-in event,
        closing each of the SOV and the solenoid valve in the CPV to discontinue purging.

12. The method of claim 11, wherein purging fuel vapors from the canister during boosted conditions comprises flowing fuel vapors from the canister through the solenoid valve in the CPV, past a check valve upstream of the ejector, and via the ejector into an inlet of a compressor.

13. The method of claim 12, wherein the fuel vapors flow into the inlet of the compressor positioned upstream of an intake throttle, past the intake throttle, and thereon into an intake manifold.

14. The method of claim 13, further comprising, during boosted conditions and when intake manifold pressure is lower than a pressure in the canister, purging additional fuel vapors from the canister through the sonic nozzle into the intake manifold.

15. The method of claim 14, wherein purging additional fuel vapors through the sonic nozzle includes flowing additional fuel vapors from the canister through the solenoid valve in the CPV into the sonic nozzle in the CPV, and then on into the intake manifold downstream of the intake throttle.

16. The method of claim 11, further comprising, during non-boosted conditions, not generating vacuum at the ejector such that purged fuel vapors from the canister do not flow via the ejector, and only flowing fuel vapors from the canister through each of the solenoid valve and the sonic nozzle in the CPV.

17. The method of claim 11, wherein the solenoid valve and the sonic nozzle are positioned together within a single, common housing in the CPV, and wherein the sonic nozzle is located proximate to the solenoid valve.

18. A system for an engine, comprising:
    an intake manifold;
    an intake throttle;
    a boost device including a compressor, the compressor positioned in an intake passage upstream of the intake throttle;
    a canister purge valve comprising a solenoid valve and a sonic choke, the sonic choke coupled immediately downstream of the solenoid valve;
    an inlet of the sonic choke fluidically coupled to an outlet of the solenoid valve;

an outlet of the sonic choke fluidically coupled to the intake manifold via a second port of the canister purge valve, the outlet of the sonic choke coupled to the intake manifold downstream of the intake throttle;
a fuel vapor canister fluidically communicating with an inlet of the canister purge valve via a first port;
an ejector coupled in a compressor bypass passage, the compressor bypass passage including a shut-off valve;
a suction port of the ejector fluidically communicating with a third port of the canister purge valve via a second check valve, the third port positioned between the outlet of the solenoid valve and the inlet of the sonic choke;
a motive inlet of the ejector coupled to the intake passage downstream of the compressor; and
a motive outlet of the ejector coupled to the intake passage upstream of the compressor.

19. The system of claim 18, wherein the shut-off valve controls motive flow through the ejector, and wherein the solenoid valve and the sonic choke are positioned within a single, common housing of the canister purge valve.

20. The system of claim 19, further comprising a controller with computer-readable instructions stored in non-transitory memory for simultaneously closing the shut-off valve and the solenoid valve in the canister purge valve during an operator tip-in event.

* * * * *